United States Patent
Murison et al.

(10) Patent No.: US 8,816,246 B2
(45) Date of Patent: Aug. 26, 2014

(54) METHOD AND APPARATUS FOR DRILLING USING A SERIES OF LASER PULSES

(75) Inventors: Richard Murison, St-Lazare (CA); Mathew Rekow, Santa Cruz, CA (US)

(73) Assignee: ESI-Pyrophotonics Lasers, Inc., Quebec (CA)

( * ) Notice: Subject to any disclaimer, the term of this patent is extended or adjusted under 35 U.S.C. 154(b) by 423 days.

(21) Appl. No.: 13/100,995

(22) Filed: May 4, 2011

(65) Prior Publication Data
US 2012/0111841 A1      May 10, 2012

Related U.S. Application Data

(60) Provisional application No. 61/331,242, filed on May 4, 2010.

(51) Int. Cl.
*B23K 26/38*     (2014.01)
*B23K 26/06*     (2014.01)

(52) U.S. Cl.
CPC ............. *B23K 26/381* (2013.01); *B23K 26/063* (2013.01)
USPC ................................. 219/121.71; 219/121.61

(58) Field of Classification Search
USPC ............... 219/121.7, 121.71, 121.61, 121.76, 219/121.77
See application file for complete search history.

(56) References Cited

U.S. PATENT DOCUMENTS

| | | | |
|---|---|---|---|
| 5,037,183 A * | 8/1991 | Gagosz et al. ............. | 219/121.7 |
| 5,093,548 A * | 3/1992 | Schmidt-Hebbel ...... | 219/121.71 |
| 5,973,290 A | 10/1999 | Noddin | |
| 6,229,113 B1 * | 5/2001 | Brown ...................... | 219/121.7 |
| 6,804,574 B2 * | 10/2004 | Cheng et al. .................. | 700/166 |
| 7,282,666 B2 | 10/2007 | Agarwal et al. | |
| 7,428,253 B2 | 9/2008 | Murison et al. | |
| 7,742,511 B2 | 6/2010 | Murison et al. | |
| 2002/0092833 A1 | 7/2002 | Lipman et al. | |
| 2002/0132402 A1* | 9/2002 | Tanaka et al. ................. | 438/166 |
| 2004/0164060 A1* | 8/2004 | Maeda et al. ............ | 219/121.71 |

(Continued)

FOREIGN PATENT DOCUMENTS

| | | | |
|---|---|---|---|
| CN | 101687278 A | | 3/2010 |
| GB | 2313079 A | * | 11/1997 |
| JP | 10-323781 A | * | 12/1998 |
| WO | 9838001 | | 9/1998 |

OTHER PUBLICATIONS

Machine translation of Japan Patent document No. 10-323,781, May 2013.*

(Continued)

*Primary Examiner* — Geoffrey S Evans
(74) *Attorney, Agent, or Firm* — Haynes Beffel & Wolfeld LLP

(57) ABSTRACT

A series of laser pulses, each pulse characterized by one or more predetermined pulse characteristics including wavelength, pulse energy, inter-pulse time interval, pulse width or pulse shape, is provided to drill a hole in a material. Drilling the hole in the material is achieved by placing the series of laser pulse spots at the location wherein the hole is to be drilled. One or more characteristics of one or more laser pulses in the series is changed in order to optimize the drilling process for the hole. The ability to change the characteristics of one or more laser pulses in the series of pulses to optimize the drilling process results in holes with desired attributes and a high drilling rate.

37 Claims, 13 Drawing Sheets

(56) References Cited

U.S. PATENT DOCUMENTS

| | | | |
|---|---|---|---|
| 2005/0247683 A1 | 11/2005 | Agarwal et al. | |
| 2006/0091126 A1* | 5/2006 | Baird et al. | 219/121.71 |
| 2007/0075063 A1* | 4/2007 | Wilbanks et al. | 219/121.85 |
| 2008/0296272 A1* | 12/2008 | Lei et al. | 219/121.69 |
| 2011/0142084 A1 | 6/2011 | Reid et al. | |

OTHER PUBLICATIONS

Lee et al., "Excimer VS Nd:YAG Laser Creation of Silicon VIAS for 3D Interconnects", IEEE/CHMT, Intl Electronics Manufacturing Technology Sympoisum, Sep. 1992, pp. 358-360.*

Tan, B., "Deep micro hole drilling in a silicon substrate using multibursts of nanosecond UV laser pulses", Journal of Micromechanics and Microengineering, 2006, 5 pages.

Notification of Transmittal of the International Search Report and the Written Opinion of the International Searching Authority, or the Declaration; International Search Report and the Written Opinion of the International Searching Authority for corresponding International Application No. PCT/US2011/035207 mailed on Aug. 2, 2011, 14 pages.

International Search Report and Written Opinion of PCT/US2011/035207, 6 pages.

Chinese Office Action dated May 6, 2014 for Chinese Application No. 201180022023.7.

* cited by examiner

METHOD AND APPARATUS FOR DRILLING USING A SERIES OF LASER PULSES

CROSS-REFERENCES TO RELATED APPLICATIONS

This application claims priority to U.S. Provisional Patent Application No. 61/331,242, filed on May 4, 2010, the disclosure of which is hereby incorporated by reference in its entirety for all purposes.

BACKGROUND OF THE INVENTION

Pulsed laser sources, such as Nd:YAG lasers have been used to perform laser-based material processing for applications such as marking, engraving, micro-machining, and cutting. Many existing high power pulsed lasers that are characterized by pulse energies greater than 0.5 mJ per pulse, rely on techniques such as Q-switching and mode locking to generate optical pulses. However, such lasers produce optical pulses with characteristics that are predetermined by the cavity geometry, the mirror reflectivities, and the like. As such, such laser pulses cannot generally be varied in the field without compromising the laser performance. Using such lasers, it is generally difficult to achieve a range of variable pulse characteristics.

Thus, there is a need in the art for improved methods and systems related to pulsed laser sources and applications for such pulsed laser sources.

SUMMARY OF THE INVENTION

The present invention relates generally to laser processing of materials. More particularly, the present invention relates to methods and apparatus employing a series of laser pulses whose attributes have been specifically determined to provide improved processing quality and higher throughput in laser processing applications. The present invention also relates to drilling holes in a variety of materials using a series of laser pulses. However, the invention has broader applicability and can be applied to other applications and materials.

Pulsed laser sources, such as Nd:YAG lasers, have been used to perform laser-based material processing for applications such as marking, engraving, micro-machining, cutting, and drilling. One such process where lasers are commonly used is to drill small holes in materials. These small holes are sometimes referred to as "vias." These holes can be through holes which pass completely through the material or they can be blind holes which start on one side but end at some point within the material. Lasers can be used to drill holes in a variety of materials including for example semiconductors like silicon; metals such as copper; ceramics such as silica; glass and a wide variety of other materials. Lasers are also used to drill holes in samples composed of multiple layers of different materials such as for example electric circuit boards composed of alternating layers of dielectric and copper.

One technique to drill holes in a sample using a laser is percussion drilling. In percussion drilling, one or more pulses of light from the laser are focused, imaged or directed at a position on the material where the hole is desired to be drilled. The light focused, imaged or directed at the material forms a spot referred to herein as the laser spot. Each pulse removes some material until the hole reaches a desired depth or until the hole goes completely through the material. Lasers employed for percussion drilling typically deliver a stream of laser pulses of equal energy and repetition rate (each pulse within the series is equally distant in time from the previous and following pulse). When drilling more than one hole using percussion drilling there are nominally three schemes under which the laser pulses can be delivered to the material. These schemes comprise (i) directing a first series of pulses at a first hole until that hole is complete, and then directing a second series of pulses at a second hole until that hole is complete, and so forth until all the holes are complete; or (ii) directing a first pulse at a first hole, then a second pulse at a second hole, then a third pulse at a third hole, and so forth until one pulse has been directed at each hole, and then repeating the series until all holes are complete, or (iii) directing a first series of pulses at a first hole, then a second series of pulses at a second hole, and so forth until a series of pulses has been directed at each hole, then repeating the series until all of the holes are complete. Scheme (i) is referred to as a single pass drilling process, and schemes (ii) and (iii) are referred to as multiple pass processes. Although it is possible in some cases to drill a hole through a very thin material using just one pulse from a laser, typically laser drilling of holes requires a series of two or more laser pulses.

Lasers have a number of advantages for drilling holes. A laser beam can be focused to a very small spot to drill small holes and drill each hole very quickly. Laser drilling is a non-contact process where the laser beam can be directed remotely using an optical system including lenses, mirrors and other directing means, or alternately the sample itself may be moved. Such directing means can be computer controlled so that repositioning of the beam can be accomplished many times per second. Thus, many holes can be drilled using a laser in a short period of time. The parameters of the laser such as pulse energy, pulse width (also referred to as pulse length), temporal pulse shape, peak power, average power, repetition rate are typically chosen to be optimal values to obtain the most desirable hole attributes for the desired application. This often means selecting a different laser for each application since, for many lasers, a laser's parameters cannot normally be adjusted over a wide range, nor independently from one another.

Laser parameters include its pulse repetition rate, which determines the time interval between pulses. For many lasers, a change in repetition rate also results in a change in the pulse energy. This change in pulse energy can impact the quality, throughput, or other properties of the hole being drilled. However, the inter-pulse interval itself is in many circumstances less important that the concomitant changes in pulse energy that are implied if the inter-pulse interval should change. Therefore there is often some flexibility available in drilling a plurality of holes, such that if a series of pulses is required to drill a hole, it may not matter what the time interval between the individual pulses actually is provided the other parameters of the laser pulse can be relied upon to be the desired ones. It will be recognized by those skilled in the art that there are an enormous number of permutations within which N series of X pulses can be delivered to N holes, and that the time intervals between individual pulses in the series directed at any one specific hole may in some of those permutations be highly irregular.

One example where pulsed lasers are used to drill holes is drilling of through vias in silicon wafers. Lasers are advantageous in this particular application since the required diameter of via holes in silicon wafers can be as small as 5 μm and in some cases (such as for example solar cells) it is required to drill hundreds of through vias per second. In most cases, the laser drilling of vias in silicon wafers is one step in a manufacturing process to make an electronic device. Other steps in the process will often impose quality requirements on the via holes that they have a certain shape such as a barrel shape or a tapered shape, the side wall will be smooth, the kerf at the hole entrance will have a maximum height, and that the debris and residue near the entrance hole will be minimized, and other specific requirements. In order to achieve these quality requirements, it is desirable to be able to predetermine and select optimal characteristics of the laser pulses, including optimal pulse energy, pulse width, pulse repetition rate, peak power or energy, and temporal pulse shape, as appropriate to the particular application.

Many existing high power pulsed lasers which are characterized by pulse energies greater than 0.1 mJ per pulse rely on techniques such as Q-switching and mode locking to generate optical pulses. Such lasers produce optical pulses with characteristics that are predetermined by the cavity geometry, the mirror reflectivities, and the like. Using such lasers, it is generally difficult to achieve an optimal pulse width or pulse shape for the application at hand. Likewise, changing a characteristic or characteristics of a laser pulse such as pulse energy or repetition rate in mid-series of a series of pulses can lead to undesirable perturbations such as a sudden pulse energy increase called super-pulsing or intermittent pulse energy fluctuations for a number of pulses in the series. In many cases, therefore, the laser drilling of holes has deficiencies.

The present invention relates to a method to drill a hole in a material using a series of laser pulses where one or more characteristics of one or more laser pulses is changed in the series in order to optimize the drilling process for that hole. In one embodiment shown schematically in FIG. 1, a series S1 of laser pulses is provided to drill a hole in a material where the series S1 includes a number of pulses of energy E1 with inter-pulse time interval of T1, followed by an inter-pulse time interval L1, then followed by a further number of pulses of energy E2 with inter-pulse time interval T2. The selection of values E1, E2, L1, T1, T2 may be predetermined to optimize certain important properties of the hole as well as the speed of drilling the hole. In other embodiments of the invention, a series of laser pulses is provided to drill a hole in a material where the series of laser pulses may contain pulses with different energies or inter-pulse time intervals or pulse widths or pulse shapes as predetermined to optimize the drilling process. Pulse width is defined as full width half maximum FWHM of the optical pulse. The characteristics chosen for each pulse in the series of pulses to drill the hole is predetermined to provide improved properties of the hole drilled thereby and the speed of drilling the hole drilled thereby compared to the results obtained using a series of pulses where the characteristics of each pulse in the series are identical with the characteristics of every other pulse in the series.

Embodiments of the present invention described herein provide a number of advantages in laser drilling of holes. FIG. 2a shows a schematic cross-sectional view of a laser-drilled via hole in a silicon wafer. A hole drilled in a material can be characterized by a number of attributes. For example, a via hole can have a barrel shape where the entrance and the exit have approximately equal dimensions. Alternately, a via hole can have a tapered shape where the entrance is larger than the exit, as illustrated in FIG. 2a. In an embodiment of the invention, a series of pulses is used to drill a hole whereby one or more pulse characteristics including energy and the inter-pulse time interval are changed for one or more pulses in the series such that the shape of the resultant hole will have a specific tapered profile. Likewise, in a further embodiment of the invention, a series of pulses is provided whereby one or more pulse characteristics including energy and the pulse width are changed for one or more pulses in the series such that the shape of the resultant hole will have a certain barrel-shaped profile. In a further embodiment of the invention, a series of pulses is provided whereby one or more pulse characteristics including energy, inter-pulse time interval, pulse width, and temporal pulse shape are changed such that the shape of the exit hole will be round with smooth edges and the side walls of the hole will be smooth. Since the laser drilling process is frequently ablative in nature, the surface immediately adjacent to the hole entrance may exhibit an area of built-up material attached to the substrate called a kerf. Scattered on the surface near the entrance to the hole, there may be debris or residue which may be attached to the substrate or lying unattached. In another embodiment of the invention, a series of pulses is provided to drill a hole in a material where the characteristics of an initial number of pulses in the series are chosen to reduce the explosive ablative effect but subsequent pulses in the series are chosen to increase drilling speed as the hole gets deeper into the silicon wafer with the result that debris, residue and kerf of the hole drilled thereby is reduced but the speed of drilling the hole is high compared to that hole obtained when the characteristics of each pulse in the series remain unchanged. In the process of drilling a hole in a silicon wafer, using a series of pulses wherein the characteristics of each pulse are predetermined to optimize the drilling process rather than using a series of pulses where the pulse characteristics are all identical throughout the series provides a significant improvement in the quality of the holes drilled thereby, and also the reliability of the devices generated thereby, and also a significant improvement in the speed of drilling and thus the yield of the number of devices which are acceptable to advance into the next stage of manufacturing.

In another embodiment of the present invention, a laser system is provided to generate a series of laser pulses to drill a hole in a material such that a characteristic or characteristics of one or more pulses in the series is changed in order to optimize the drilling of a hole in a material. The pulsed laser source includes a seed source adapted to generate a seed signal and an optical circulator having a first port coupled to the seed source, a second port, and a third port. The pulsed laser source also includes a modulator driver adapted to produce a shaped electrical waveform and an amplitude modulator coupled to the modulator driver and adapted to receive the shaped electrical waveform. The amplitude modulator is characterized by a first side coupled to the second port of the optical circulator and a second side. The pulsed laser source further includes a first optical amplifier characterized by an input end and a reflective end. The input end is coupled to the second side of the amplitude modulator. Moreover, the pulsed laser source includes a second optical amplifier coupled to the third port of the optical circulator.

In order to drill a number N of holes, the laser system provides N predetermined series $S_1, S_2, \ldots S_N$ of laser pulses with a time interval between each series of sufficient length to allow the laser beam to be repositioned from one region of the sample where the hole has been drilled to an adjacent region of the sample where the next hole is to be drilled. In a particular embodiment designed to drill identical holes in a uniform material such as a silicon wafer, a laser system is provided to generate a series of laser pulses such that each series of pulses will be identical to each other series with the goal that each hole drilled thereby is approximately identical to each of the other holes, and the laser system is included in a processing system including means to direct the laser beam at each hole to be drilled and to control the drilling process. In a particular embodiment designed to drill identical holes in a uniform material such as a silicon wafer, a laser system is provided to generate a series of laser pulses such that certain of the pulses within each series will have laser parameters which differ significantly and intentionally from other laser pulses in the same series with the goal that each hole drilled thereby is approximately identical to each of the other holes and has certain preferred characteristics, and the laser system is included in a processing system including means to direct the laser beam at each hole to be drilled and to control the drilling process. In a further particular embodiment designed to drill N different holes in a uniform material such as a silicon wafer, a laser system is provided to generate N predetermined series $S_1, S_2, \ldots S_N$ of laser pulses such that certain of the pulses within one or more series will have laser parameters which differ significantly and intentionally from other laser pulses in the same series, and certain series will include pulses whose laser parameters differ from those contained within other series, with the goal that certain of the N holes drilled thereby will have certain preferred characteristics different from those of other holes in the wafer, and the laser system is included in a processing system including means to direct the laser beam at each hole to be drilled and to control the drilling process.

In another embodiment, a laser system is provided to generate a series of laser pulses with a beam positioning system such that the first pulse in the pulse series $S_1$ is directed at the first hole, then the second pulse of series $S_1$ is directed at the second hole, and so forth until last pulse in the pulse series $S_1$ has been directed at the last hole; after which the first pulse in the pulse series $S_2$ is directed at the first hole, then the second pulse of series $S_2$ is directed at the second hole, and so forth until last pulse in the pulse series $S_2$ has been directed at the last hole; and so forth until each of the holes have had a complete series of pulses directed at them. The time intervals between any two consecutive pulses in the overall pulse sequence will be of sufficient duration to permit the beam positioning system to direct the beam from one hole to the next, but there will not be any further requirement for a pause to change laser pulse parameters. Of course, in like manner, it is possible that the second pass would include two pulses from series $S_2$ per hole. Multi-pass drilling processes are typically used instead of a single pass process (where each hole is drilled sequentially), for example, when an adjustment is made to the optical imaging system partway through each hole or if a different laser is used in a second pass to drill the hole through a second layer. It will be recognized by those skilled in the art that there are a number of permutations within which N series of X pulses can be delivered to N holes other than the two simple arrangements outlined above. In other embodiments of this invention, one or more of these permutations are accommodated. According to some embodiments of the present invention, there is no need for a lengthy pause during this pulse sequence in order to change a laser pulse parameter from one pulse series to the next.

In yet another embodiment, a laser system is provided to generate a series of laser pulses with a beam positioning system such that the first pulse in the pulse sequence $S_1$ is directed at the first hole, then the first pulse of sequence $S_2$ is directed at the second hole, and so forth until first pulse in the pulse sequence $S_N$ has been directed at the $N^{th}$ hole; after which the second pulse in the pulse sequence $S_1$ is directed at the first hole, then the second pulse of sequence $S_2$ is directed at the second hole, and so forth until second pulse in the pulse sequence $S_N$ has been directed at the $N^{th}$ hole; and so forth until each of the holes have had a complete series of pulses $S_x$ directed at them. The time intervals between any two consecutive pulses in the overall pulse sequence will be of sufficient duration to permit the beam positioning system to direct the beam from one hole to the next. It will be recognized by those skilled in the art that there are an enormous number of permutations within which N sequences of X pulses can be delivered to N holes other than the two simple arrangements outlined above. In other embodiments of this invention, all such permutations are accommodated.

In a further embodiment, a laser system is provided to generate a number N of predetermined series $S_1, S_2, \ldots S_N$ of laser pulses with a time interval between each series of sufficient length to allow the laser beam to be redirected from one hole to the next in order to pre-drill each hole, and then the laser may provide N predetermined series $R_1, R_2, \ldots R_N$ of laser pulses to complete the drilling of each hole. In this embodiment, the laser pulse properties of at least one pulse in at least one series will differ from the laser pulse properties of the other pulses in that series. The laser system is included in a processing system operable to direct the laser beam at each hole to be drilled and to control the drilling process. The laser system is included in a processing system including means to direct the laser beam at each hole to be drilled and to control the drilling process. This is therefore a two step drilling process which may be used for example to drill through holes in a sample consisting of two layers of different material. In a further embodiment of the two step drilling process, two different lasers may be used, one laser to generate series $S_1, S_2, \ldots S_N$ and a second laser to generate series $R_1, R_2, \ldots R_N$.

According to an embodiment of the present invention, a method of drilling a hole in a material (e.g., a semiconductor, silicon, or the like) using multiple laser pulses is provided. The method includes providing a first set of laser pulses, each of the laser pulses being characterized by a first pulse energy, a first pulse width, a first pulse shape, a first wavelength, and a first inter-pulse time interval. The method also includes providing a second set of laser pulses, each of the laser pulses characterized by a second pulse energy, a second pulse width, a second pulse shape; a second wavelength, and a second inter-pulse time interval, wherein at least one of the second pulse energy is different from the first pulse energy, the second pulse width is different from the first pulse width, the second pulse shape is different from the first pulse shape, or the second wavelength is different from the first wavelength. The method further includes directing the first set of laser pulses to impinge at a laser spot, directing the second set of laser pulses to impinge at the laser spot, and drilling the hole in the material. As examples, the multiple laser pulses can be provided by a single laser, the first wavelength can be equal to the second wavelength, and the first wavelength and the second wavelength can be 1064 nm. In other embodiments, at least one of the first wavelength or the second wavelength is less than 1064 nm.

In an embodiment, a time between a last pulse of the first set of laser pulses and a first pulse of the second set of laser pulses is less than five times the larger of the first inter-pulse time period or the second inter-pulse time period. The method can also include determining the first pulse energy, the first pulse width, and the first pulse shape prior to providing the first set of laser pulses and determining the second pulse energy, the second pulse width, and the second pulse shape prior to providing the second set of laser pulses, wherein at least the second pulse energy is not equal to the first pulse energy, the second pulse width is not equal to the first pulse width, or the second pulse shape is not the same as to the first pulse shape.

According to an embodiment, the first set of laser pulses comprises a single laser pulse and the second set of laser pulses comprises a single laser pulse. The first pulse width can be equal to the second pulse width and the first pulse shape can be the same as the second pulse shape. The first pulse energy can be the same as the second pulse energy, and the first pulse shape can be the same as the second pulse shape. The first pulse energy and the second pulse energy are each greater than 0.05 mJ and less than 2 mJ. The first pulse width and the second pulse width are each greater than 20 ns and less than 5000 ns. A time between a last pulse of the first set of laser pulses and a first pulse of the second set of laser pulses can be about the same as the first inter-pulse time interval. A time between a last pulse of the first set of laser pulses and a first pulse of the second set of laser pulses can be about the same as the second inter-pulse time interval.

According to another embodiment, the method further includes determining the first pulse energy, the first pulse width, the first pulse shape, the first wavelength, and the first inter-pulse time interval prior to providing the first set of laser pulses and determining the second pulse energy, the second pulse width, the second pulse shape, the second wavelength, and the second inter-pulse time interval prior to providing the second set of laser pulses.

According to an embodiment of the present invention, a method of drilling a hole in a material (e.g., a semiconductor, silicon, or the like) using a series of optical pulses, each of the optical pulses being characterized by a wavelength. The method includes providing one or more first optical pulses as a first set of pulses, each of the first optical pulses being characterized by a first pulse energy, a first pulse width, and a first pulse shape and providing one or more second optical pulses as a second set of pulses, each of the second optical pulses being characterized by a second pulse energy, a second pulse width, and a second pulse shape. The method also includes providing one or more third optical pulses as a third set of pulses, each of the third optical pulses being characterized by a third pulse energy, a third pulse width, and a third pulse shape, directing the first set of pulses to impinge on the material at a location, directing the second set of pulses to impinge on the material at the location, directing the third set of pulses to impinge on the material at the location, and drilling the hole in the material at the location.

According to another embodiment, the method also includes determining the first pulse energy, the first pulse width, and the first pulse shape prior to providing the first set of pulses, determining the a second pulse energy, the second pulse width, and the second pulse shape prior to providing the second set of pulses, and determining the third pulse energy, the third pulse width, and the third pulse shape prior to providing the third set of pulses. At least the second pulse energy can be not equal to the first pulse energy, the second pulse width can be not equal to the first pulse width, or the second pulse shape can be not the same as the first pulse shape in this embodiment. The second pulse energy can be not equal to the third pulse energy, the second pulse width can be not equal to the third pulse width, or the second pulse shape can be not the same as the third pulse shape.

The first pulse energy can be between 0.05 mJ and 2 mJ, the second pulse energy can be between 0.05 mJ and 2 mJ, and the third pulse energy can be between 0.05 mJ and 2 mJ. The first pulse width can be between 20 ns and 5 µs, the second pulse width can be between 20 ns and 5 µs, and the third pulse width can be between 20 ns and 5 µs.

According to an alternative embodiment of the present invention, a method of drilling a hole in a material (e.g., a semiconductor, silicon, or the like) using a series of laser pulses is provided. The method includes providing the series of laser pulses including two or more pulses. At least one pulse in the series of laser pulses differs from another pulse in the series of pulses in at least one of wavelength, pulse energy, pulse width, or pulse shape. The method also includes directing the series of laser pulses to impinge on the material at a drilling location and drilling the hole at the drilling location. The one pulse and the another pulse can differ in pulse energy. The one pulse and the another pulse can differ in pulse width. The one pulse and the another pulse can differ in pulse shape.

According to another embodiment of the present invention, a method of drilling a hole (e.g., a barrel shape) through a material using one laser to provide a series of laser pulses, each pulse characterized by a wavelength (e.g., ~1064 nm), a pulse energy, a pulse width, and a temporal pulse shape is provided. The method includes providing a series of laser pulses characterized by time intervals between sequential pulses in the series wherein no time interval between sequential pulses is larger than 0.01 second, and such that the pulse energy of at least one pulse in the series is less than the pulse energy of another pulse in the series, directing the set of laser pulses to impinge at a laser spot; and drilling a hole through the material. The material can include a semiconductor material or silicon.

In an embodiment, the energy of the first pulse in the series is less than the energy of at least one other pulse in the series. In another embodiment, the energy of the first pulse in the series is more than 50 µJ and less than 400 µJ. In some embodiments, the energy of the last pulse in the series is more than the energy of at least one other pulse in the series. As an example, the energy of the last pulse in the series can be more than 400 µJ and less than 1000 µJ. The temporal pulse shape of every pulse in the series can be approximately square.

According to a specific embodiment of the present invention, a method of drilling a hole through a material using one laser to provide a series of laser pulses, each pulse characterized by a wavelength, a pulse energy, a pulse width, and a temporal pulse shape is provided. The method includes providing a series of laser pulses characterized by time intervals between sequential pulses in the series, wherein no time interval between sequential pulses is larger than 0.01 second, and such that the pulse width of at least one pulse in the series is shorter than the pulse width of another pulse in the series, directing the set of laser pulses to impinge at a laser spot; and drilling a hole through the material.

The material can include a semiconductor material or silicon. The wavelength can be about 1064 nm. The hole can have a tapered shape. The pulse width of the first pulse in the series can be shorter than the pulse width of another pulse in the series. The pulse width of the first pulse in the series can be more than 20 ns FWHM and less than 200 ns FWHM. The pulse width of the last pulse in the series can be longer than the pulse width of another pulse in the series. The pulse width of the last pulse in the series can be more than 400 ns FWHM but less than 1000 ns FWHM. The temporal pulse shape of every pulse in the series can be approximately square.

According to another specific embodiment of the present invention, a method of drilling a hole through a material (e.g., a semiconductor or silicon) using one laser to provide a series of laser pulses, each pulse characterized by a wavelength (e.g., 1064 nm), a pulse energy, a pulse width, and a temporal pulse shape is provided. The method includes providing a series of laser pulses characterized by time intervals between sequential pulses in the series, wherein no time interval between sequential pulses is larger than 0.01 second, and such that the temporal pulse shape of at least one pulse in the series is substantially different than the temporal pulse shape of another pulse in the series, directing the set of laser pulses to impinge at a laser spot, and drilling the hole through the material.

In an embodiment, the exit side of the hole is clearly defined and the side wall of the hole is smooth. In another embodiment, the temporal pulse shape of at least one pulse in the series has a square profile. The temporal pulse shape of at least one pulse in the series can have a power spike followed by a power plateau.

According to an embodiment of the present invention, a method of drilling a plurality of holes in a material using a series of laser pulses is provided. The method includes providing the series of laser pulses including a first set of laser pulses being characterized by a first wavelength, a first pulse energy, a first pulse width, and a first pulse shape and a second set of laser pulses being characterized by a second wavelength, a second pulse energy, a second pulse width, and a second pulse shape, wherein the first series of laser pulses differs from the second series of laser pulses in at least one of wavelength, pulse energy, pulse width, or pulse shape. The method also includes directing a first pulse of the first set of laser pulses to impinge on the material at a first drilling location and directing subsequent pulses of the first set of laser pulses to impinge on the material at subsequent drilling locations. The method further includes directing a first pulse of the second set of laser pulses to impinge on the material at the first location and directing subsequent pulses of the second set of laser pulses to impinge on the material at the subsequent drilling locations.

According to some embodiments, the method additionally includes providing a third set of laser pulses being characterized by a third wavelength, a third pulse energy, a third pulse width, and a third pulse shape, wherein the third series of laser pulses differs from at least the first series of laser pulses or the second series of laser pulses in at least one of wavelength, pulse energy, pulse width, or pulse shape, directing a first pulse of the third set of laser pulses to impinge on the material at the first drilling location, and directing subsequent pulses of the third set of laser pulses to impinge on the material at the subsequent drilling locations.

The third series of laser pulses can differ from at least the first series of laser pulses or the second series of laser pulses in pulse width, pulse shape, or pulse energy. The second series of laser pulses can differ from the first series of laser pulses in pulse width, pulse shape, or pulse energy.

According to an alternative embodiment, a method of drilling a hole in a material using a series of laser pulses is provided. The method includes providing a series of laser pulses comprising a first laser pulse characterized by a first wavelength, a first pulse energy, a first pulse width, and a first pulse shape, a second laser pulse characterized by a second wavelength, a second pulse energy, a second pulse width, and a second pulse shape, and a third laser pulse characterized by a third wavelength, a third pulse energy, a third pulse width, and a third pulse shape, wherein the first laser pulse differs from the second laser pulse in at least one of wavelength, pulse energy, pulse width, or pulse shape and the third laser pulse differs from at least one of the first laser pulse or the second laser pulse in at least one of wavelength, pulse energy, pulse width, or pulse shape. The method also includes directing the first laser pulse to impinge on the material at a drilling location, directing the second laser pulse to impinge on the material at the drilling location, and directing the third laser pulse to impinge on the material at the drilling location.

In an embodiment, the method further comprises providing subsequent sets of the series of laser pulses and directing the subsequent sets of the series of laser pulses at subsequent drilling locations. The third laser pulse can differ from at least the first laser pulse or the second laser pulse in pulse width, pulse shape, or pulse energy. The second laser pulse can differ from the first laser pulse in pulse width, pulse shape, or pulse energy.

Numerous benefits are achieved using the present invention over conventional techniques. For example, in an embodiment according to the present invention, high power, pulsed lasers suitable for drilling holes in materials are provided that utilize a compact architecture that is inexpensive in comparison to lasers with comparable performance characteristics. Furthermore, in an embodiment according to the present invention, pulsed lasers suitable for drilling holes in materials are provided such that adjustment to the laser can be made so that one or more characteristics of one or more optical pulses in a series of pulses can be changed to optimize the hole drilling process in a material. The pulse characteristics include but are not restricted to pulse energy, the time interval between adjacent pulses, pulse width, pulse profile and peak power. Depending upon the embodiment, numerous benefits exist including for example improvements in quality of the holes drilled thereby and the yield of the processed items. These and other benefits have been described throughout the present specification and more particularly below. Various additional objects, features and advantages of the present invention can be more fully appreciated with reference to the detailed description and accompanying drawings that follow.

DETAILED DESCRIPTION OF SPECIFIC EMBODIMENTS

The technology of multiple layered circuits has been common in the electronics industry for many years ranging from the large multilayer copper dielectric circuit board to the tiny silicon integrated circuit. Integrated circuits are widely used in electronic devices such as telephones, computers, automobiles and a number of other equipment. Whenever a multilayer design is used, it is necessary to make connections between layers using holes. In the case of silicon wafers used in the manufacture of integrated circuits, these holes are usually referred to as vias. As shown schematically in FIG. 2b, a silicon wafer may typically contains thousands of vias and so a method to drill holes must be fast and result in holes with desirable attributes for the device being fabricated. Indeed, requirements determined by subsequent steps in the manufacturing process will typically define these desirable attributes.

Figure 2A:
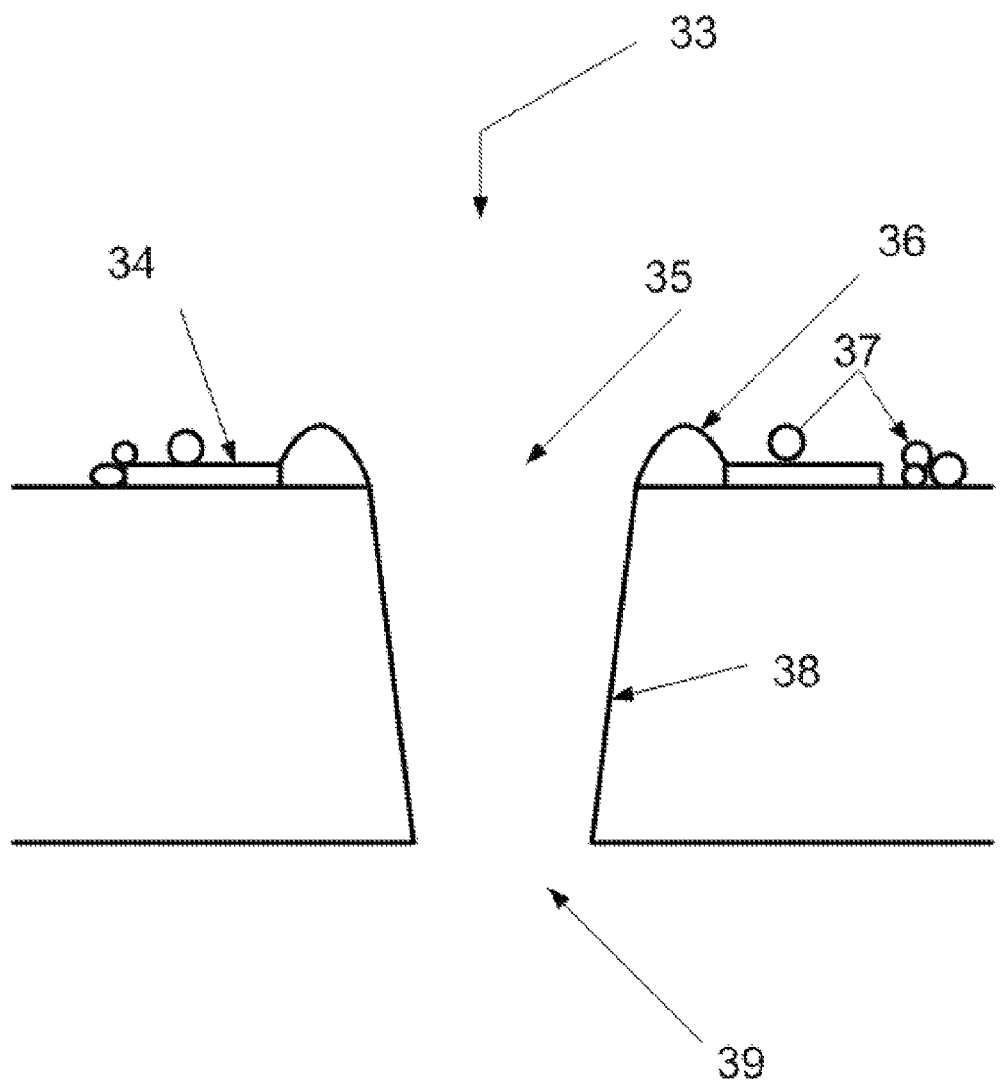
FIG. 2a shows a schematic cross-sectional view of a laser-drilled via (through hole) in a silicon wafer.
Figure 2B:
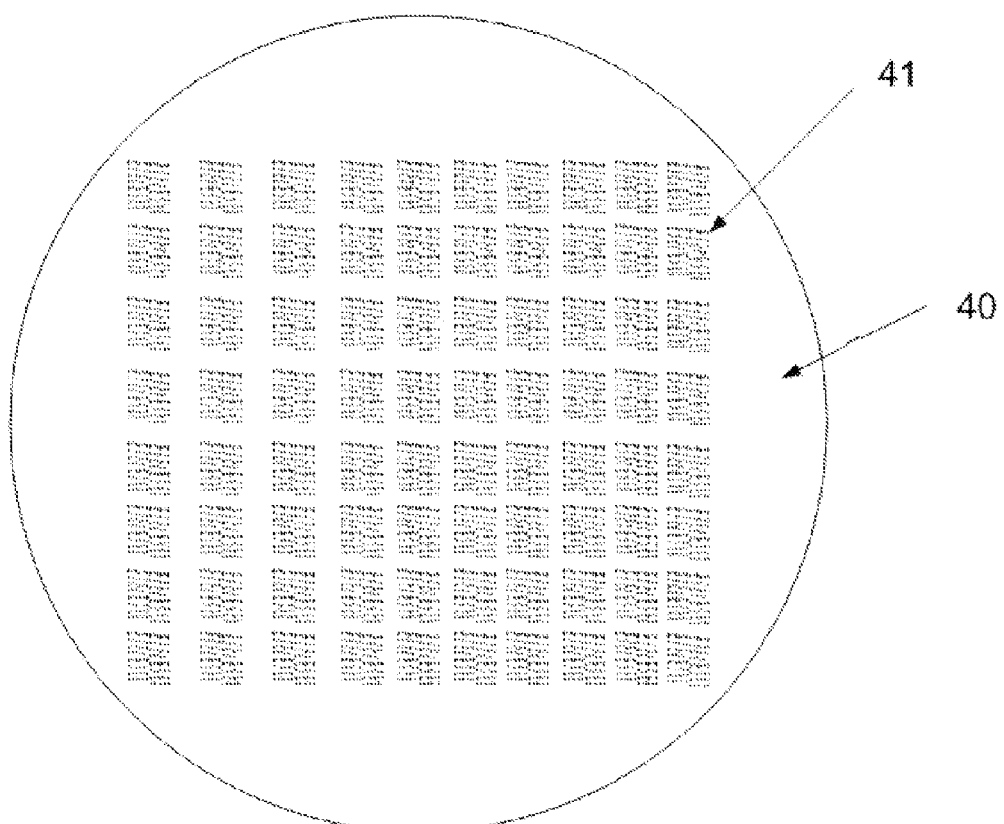
FIG. 2b shows a schematic view of a silicon wafer showing multiple laser-drilled vias therein.

A schematic representation of a single via in a silicon wafer is shown in FIG. 2a. Important attributes for the via include the size of the entrance and exit holes, the ellipticity of the entrance and exit holes, the roughness of the edge of the entrance and exit holes, the height of the kerf around the entrance hole, the quantity and extent of the debris scattered near the entrance and exit holes, the thickness and extent of any residue deposited on the surface near the entrance and exit holes, the roughness of the side walls of the hole, the curvature of the sides walls, and other attributes. Since a silicon wafer can contain many thousands of vias, it is important that the attributes of each via be approximately the same; therefore, reproducibility of the drilling process is also important. Of course, drilling vias in silicon wafers is but one example of holes drilled in materials and for each specific application and material there will be a set of desirable attributes for each hole.

Some example of pulsed lasers used to drill holes in a material include pulsed $CO_2$ lasers used to drill holes in glass, excimer lasers used to drill holes in plastics, pulsed Nd:YAG lasers used to drill holes in silicon, pulsed Nd:YLF lasers harmonically-tripled to an ultraviolet wavelength used to drill holes through copper, pulsed $CO_2$ lasers used to drill holes in dielectric insulation of printed circuit boards, pulsed Nd:YAG lasers used to drill holes in polymers, and many other examples. When a pulsed laser is used to drill a hole in a material, the most common technique is called percussion drilling although other techniques do exist such as, for example, trepanning. In percussion drilling, the laser beam is focused or imaged to a laser spot at the location where the hole is to be drilled and each individual pulse removes some material until the required depth of the hole is achieved (blind hole) or the hole punches through the other side of the material (through hole).

For any pulsed laser, there are one or more operating characteristics which can be chosen to optimize the drilling process. For example, it is possible to select the pulse energy of the laser. As a rule of thumb, the higher the pulse energy, the more material will be removed by each pulse and therefore the fewer the number of pulses required to drill the hole. In some cases, high pulse energy can have deleterious effects such as more material ejected as debris and residue, and increased roughness of the walls and the edges of the entrance and exit holes. If such effects are considered undesirable for a particular application, then it may be advantageous to use a lower pulse energy which could result in more pulses being required to drill the hole. Another operating characteristic that could be chosen to speed up the drilling process would be to choose a high laser repetition rate which means a smaller inter-pulse time interval. In some cases such as for example if there is a heat-induced effect which lingers for a period of time, a short inter-pulse time interval can negatively affect the quality of the hole through the excess build-up of background heat or by other means. It may happen that due to the physics of the interaction of light with the material, longer laser pulses will be more efficient to remove material than shorter laser pulses. There are a wide number of possibilities. In a typical manufacturing situation, an operator will perform a series of experiments where values are chosen for the laser operating characteristics, sample holes are drilled using pulses with those chosen values, and the holes drilled thereby are examined. By drilling holes using a variety of values for the laser operating characteristics, the operator will decide which set of values provides holes with acceptable quality at a desired drilling rate (holes per second). For the manufacturing process, the laser will then be set to provide pulses with an optimal value chosen for each operating characteristic as determined by these experiments.

According to embodiments of the present invention, pulse parameters are predetermined as described throughout the present specification. The operation described herein differs from some conventional pulsed laser systems (e.g., Q-switched lasers) that have different pulse parameters for successive pulses following a discontinuity in the trigger rate. Rather than merely responding to the gain profile as a function of time, which is the behavior in a Q-Switched laser, embodiments of the present invention provide active control of the pulse parameters to provide a pulse train suitable for the various drilling operations. Operation of the laser to provide pulses with particular, predetermined pulse parameters can be referred to as providing a series of pulses with predetermined pulse properties. In an embodiment of the present invention, the selection of pulse characteristics for pulses in a series of pulses is predetermined in order to provide a desired property of the hole or holes to be drilled using that series of pulses. According to some embodiments of the present invention, predetermined pulse properties are provided by setting one or more particular parameters of the laser, each to one of a multitude of values to which such parameters may be independently set. This method contrasts with operation in which one adjustable parameter is set to a certain value such that other non-adjustable parameters of the laser are modified by consequence of the laser design to achieve certain desired properties.

For most conventional lasers, it is not possible or at least very difficult to change some of the operating characteristics. Although it is usually possible to choose the pulse energy and the inter-pulse time interval, it may not be possible to change these values without stopping the laser. If an attempt is made to change pulse operating characteristics without a pause, then a result can be instability in the pulse energy for a number of pulses before they stabilize. For example, if a change in inter-pulse time interval is made without a pause, there may be a sudden increase in pulse energy for the next few pulses.

Unfortunately, for some lasers, it is often not even possible to change some important characteristics like the pulse width, peak power, or the pulse shape at all. This is because these parameters may be determined by such things as the laser gain medium itself or the optical resonator cavity of the laser.

Fiber lasers are lasers for which an active gain medium is an optical fiber. For some fiber lasers, it is possible to change or program many of the operating characteristics which had not been previously accessible with other kinds of lasers. The ability to choose values for peak power, pulse width and temporal pulse shape has allowed improvements to be achieved in some materials processing applications including drilling of holes. Shorter pulses (which often have higher peak power) often result in a cleaner material removal because the process becomes ablative rather than thermal. As one example, energy in a short laser pulse can be deposited in a short enough period of time before any melting of the material can occur. In contrast, material melted by a longer pulse in a slower thermal interaction with the material may be more prone to splattering onto the surface near the entrance hole thereby forming excessive residue or debris. Similarly, short laser pulses can often achieve smoother side walls in a hole. However, material removal is often proportional to the energy delivered (at least within a certain range of energies) so in general less material will be removed by a short pulse if the pulse energy is less than a long pulse. Thus, a tradeoff can occur between achieving an acceptable hole quality and a high hole drilling rate. Therefore, the ability to set the value of a larger number of operating characteristics including pulse energy, inter-pulse time interval, pulse width, peak power, and pulse shape has encouraged the use of fiber lasers for many materials processing applications including hole drilling.

New fiber laser designs are now emerging which have the capability to change operating characteristics between pulses without a pause. With these designs, changes in values of the operating characteristics can be achieved instantly without any instability in the characteristics of subsequent pulses, including pulse energy or other characteristics. Rather than provide a series of laser pulses to drill a hole where each characteristic of all the laser pulses in the series is the same, the ability to change values of the operating characteristics in the middle of a series of pulses means that it is now possible to separately choose characteristics for each individual pulse in the series (or sets of pulses in the series) in order to optimize the drilling process. Thus, for example, for a series of laser pulses to drill a hole in a material, the initial pulses in the series may have low pulse energy and short inter-pulse time interval, but the remainder of the pulses in the series may have higher pulse energy and longer inter-pulse time period. For a series of pulses used to drill a hole in a material, it is possible to choose values of the pulse energy, inter-pulse time interval, pulse width, peak power, and pulse shape for each pulse in the series to optimize the drilling process.

Figure 1:
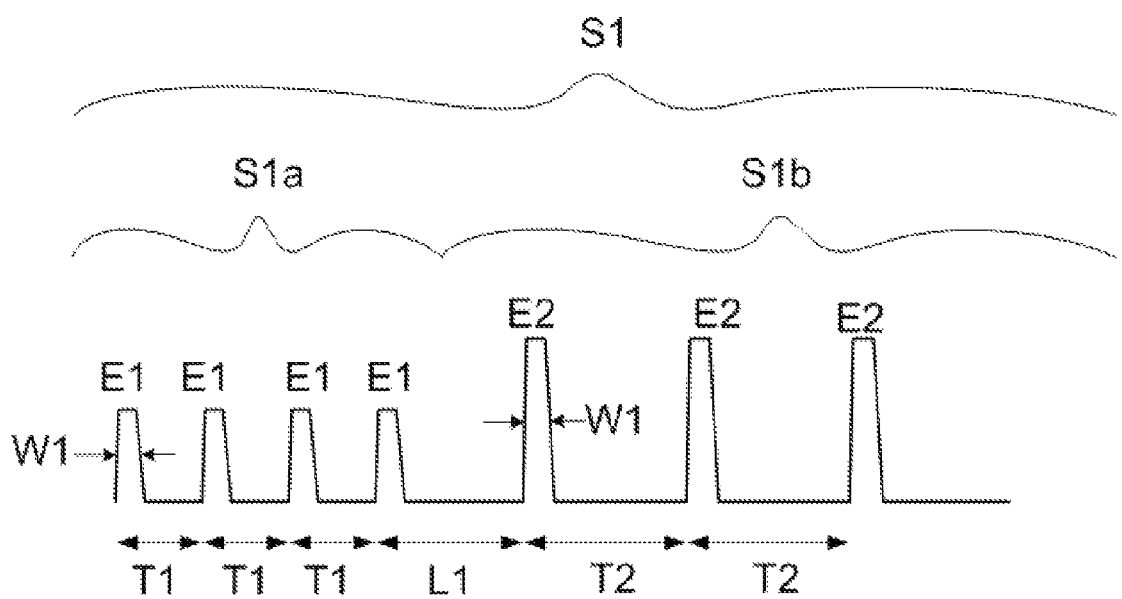
FIG. 1 is a schematic diagram of an embodiment showing a series of pulses suitable for drilling a hole in a material. In this figure, time is on the horizontal axis and power is along the vertical axis.

According to an embodiment of this invention, FIG. 1 is a schematic diagram showing a single series S1 of laser pulses all having pulse width W1 suitable for drilling a hole in a material where the pulse energy and the inter-pulse time interval changes from E1 and T1 in a first sub-series "S1a" of the series to E1 and T2 respectively in a second sub-series "S1b" of the series in order to provide the desired hole attributes at the highest drilling rate. Thus, pulses with energy E1 and inter-pulse time interval T1 would be advantageous for drilling the starting portion of the hole, but then pulses with energy E2 and inter-pulse time interval T2 would be advantageous for drilling the final portion of the hole. The time interval L1 between the first sub-series "S1a" and the second sub-series "S1b" could have a value less than either T1 or T2, a value equal to T1 or T2, or a value greater than T1 or T2. In some embodiments, the value L1 is less than five times the larger of T1 or T2, for example, about two times the larger of T1 or T2. When drilling holes of diameter 50 µm in a silicon wafer of thickness 0.15 mm using a pulsed fiber laser operating at wavelength 1064 nm, the inventors have discovered that a series of pulses similar to that shown in FIG. 1 can provide a barrel-shaped via and a reduced extent of debris and residue with acceptable drilling speed. In particular, using a relatively short pulse width 100 ns with pulse energy of 210 µJ for the first eight pulses will reduce the extent of the debris near the entrance hole. However, once the hole is started, the pulse energy of the remaining 40 pulses can be increased to 400 µJ to increase the drilling rate. If the pulse width of all 48 pulses in the series is 100 ns, a barrel-shaped through via will result. In this example, the time intervals T1 and T2 are chosen to provide the maximum laser power. Thus, in this example, T1=10.5 µs and T2=20 µs for a 20 watt average power laser. L1 is chosen to be the same as T2, namely 20 µs. Using this pulse series to drill each hole in the wafer, the potential drilling rate capability of the laser is approximately 1100 vias per second to provide the desired barrel-shaped vias with a reduced extent of debris near the entrance hole.

Figure 3:
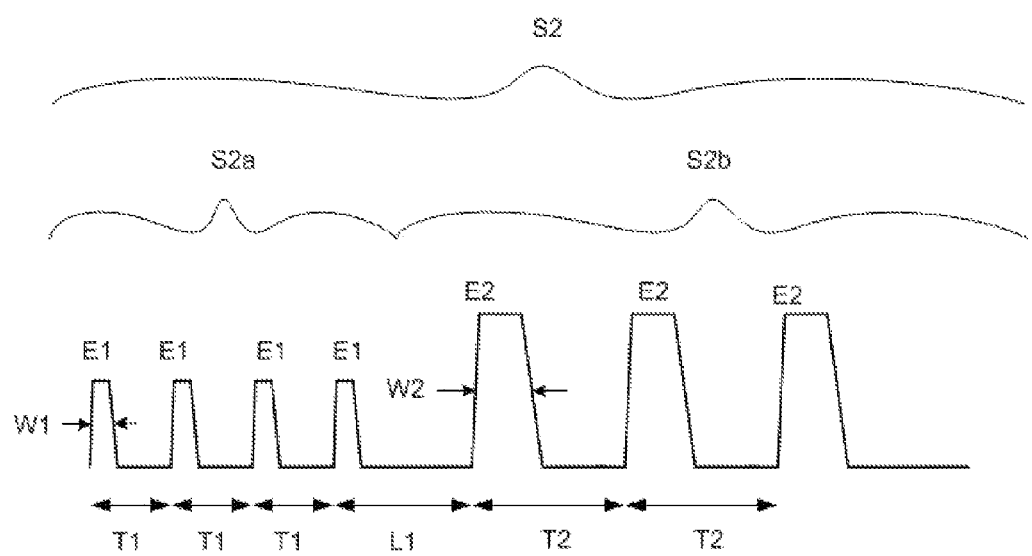
FIG. 3 is a schematic diagram of an embodiment showing a series of pulses suitable for drilling a hole in a material. In this figure, time is on the horizontal axis and power is along the vertical axis.

Other parameters than pulse energy and inter-pulse time interval may also be changed. According to another embodiment of the present invention, FIG. 3 is a schematic diagram showing a single series S2 of laser pulses suitable for drilling a hole in a material where the pulse energy, the pulse width, and the inter-pulse time interval changes from E1, W1 and T1 respectively in a first sub-series "S2a" of the series to E2, W2, and T2 in a second sub-series "S2b" of the series in order to provide desirable hole attributes at the highest drilling rate. Thus, pulses with energy E1, pulse width W1, and inter-pulse time interval T1 would be advantageous for drilling the starting portion of the hole, but then pulses with energy E2, pulse width W2, and inter-pulse time interval T2 would be advantageous for drilling the final portion of the hole. The time interval L1 between the first sub-series "S2a" and the second sub-series "S2b" could have a value less than either T1 or T2, a value equal to T1 or T2, or a value greater than T1 or T2. In some embodiments, the value L1 is a five times the larger of T1 or T2, for example, about two times the larger of T1 or T2. When drilling holes of diameter 50 µm in a silicon wafer of thickness 0.15 mm using a pulsed fiber laser operating at wavelength 1064 nm, the inventors have discovered that a series of pulses similar to that shown in FIG. 3 can provide a tapered shaped via and reduced extent of debris and residue and with fast drilling speed. In particular, using a relatively short pulse width of 100 ns and pulse energy of 400 µJ for the first four pulses will reduce the extent of the debris near the entrance hole. However, once the hole is started, for the remaining 14 pulses in the series, the pulse energy can be increased to 600 µJ and the pulse width can be increased to 500 ns to increase the drilling rate. Using relatively long pulses will result in a tapered via. shape. Starting off the series of pulses with four short pulses of lower energy and shorter pulse width will reduce the extent of the debris at the entrance hole. In this example, the time intervals T1 and T2 are chosen to provide the maximum laser power. Thus, T1=20 µs and T2=30 µs for a 20 watt average power laser. L1 is chosen to be the same as T2, namely 30 µs. Using this pulse series to drill each hole in the wafer, the potential drilling rate capability of the laser is increased to approximately 2,000 vias per second to provide the desired tapered vias with a reduced extent of debris near the entrance hole.

Figure 4:
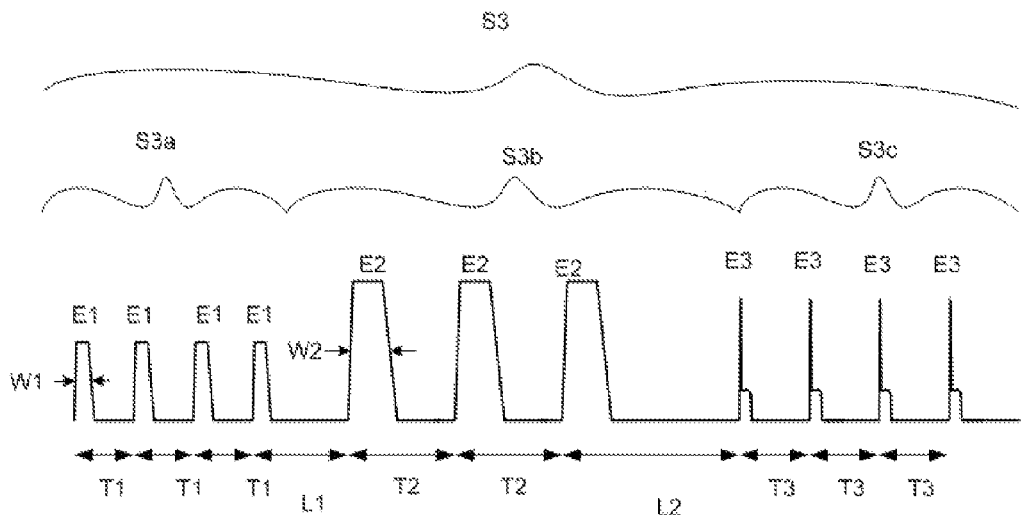
FIG. 4 is a schematic diagram of an embodiment showing a series of pulses suitable for drilling a hole in a material. In this figure, time is on the horizontal axis and power is along the vertical axis.

It is not required that a series of pulses to drill a hole in a material have only two sub-series where pulse properties differ. A series of pulses suitable for drilling a hole in a material according to an embodiment of the present invention is shown in FIG. 4 where the series of pulses include 3 sub-series S3a, S3b, and S3c. Pulses in the first sub-series S3a have pulse energy E1, pulse width W1 and inter-pulse time interval T1. Pulses in the second sub-series S3b have pulse energy E2, pulse width W2, and inter-pulse time interval T2. Pulses in the third sub-series S3c have pulse energy E3, inter-pulse time interval T3, and a special pulse shape consisting of a spike and a plateau. Thus, pulses with energy E1, pulse width W1, and inter-pulse time interval T1 would be advantageous for drilling the starting portion of the hole, but then pulses with energy E2, pulse width W2, and inter-pulse time interval T2 would be advantageous for drilling the intermediate portion of the hole, and pulses with energy E3, inter-pulse time interval T3 and the special pulse shape would be suitable for drilling the final region of the hole to provide the desired hole exit attributes. The time interval L1 between the first sub-series "S3a" and the second sub-series "S3b" could have a value less than either T1 or T2 or T3, a value equal to T1 or T2 or T3, or a value greater than T1 or T2 or T3. In some embodiments, the value L1 is less than five times the larger of T1 or T2 or T3, for example, about two times the larger of T1 or T2 or T3.

Likewise, the time interval L2 between the second sub-series "S3b" and the third sub-series "S3c" could have a value less than either T1 or T2 or T3, a value equal to T1 or T2 or T3, or a value greater than T1 or T2 or T3. In some embodiments, the value L2 is less than five times the larger of T1 or T2 or T3, for example, about two times the larger of T1 or T2 or T3. When drilling holes in silicon wafers, the inventors have observed that the breakthrough process to form the hole exit can be unpredictable, sometimes resulting in a non-round hole with jagged edges especially when using pulses with long pulse widths. When drilling holes of diameter 50 μm in a silicon wafer of thickness 0.15 mm using a pulsed fiber laser operating at wavelength 1064 nm, the inventors have discovered that a series of pulses similar to that shown in FIG. 4 can provide a tapered shape, a reduced extent of debris and residue at the entrance hole, and a round exit hole and with high drilling speed. In particular, using a relatively short pulse width 100 ns and pulse energy of 400 μJ for the first four pulses will reduce the extent of the debris near the entrance hole. However, during the middle phase of the drilling process for the next 11 pulses, the pulse energy can be increased to 600 μJ and the pulse width can be increased to 500 ns to increase the drilling rate. Finally, in order to provide a round exit hole, the pulse energy for the last 12 pulses in the series is decreased to 200 μJ with a special pulse shape. The special pulse shape includes a spike of width approximately 20 ns FWHM followed by a plateau of approximately 80 ns FWHM. The ratio of peak power spike to plateau is approximately 4:1. Indeed, in some cases, beneficial attributes of the exit hole can be achieved without the special pulse shape but by using instead a simple square pulse shape with pulse energy 200 μJ and pulse width 100 ns. Starting off the series of pulses with four short pulses of lower energy and shorter pulse width will reduce the extent of the debris at the entrance hole. Changing to longer pulses with high pulse energy when drilling the intermediate part of the hole will result in high drilling speed. Using relatively long pulses will result in a tapered via. Changing to short pulses for the final 12 pulses in the series will result in a smooth round hole exit. In this example, the time intervals T1, T2 and T3 are chosen to provide the maximum laser power. Thus, T1=20 μsec and T2=30 μsec and T3=10 μsec for a 20 watt average power laser. L1 is chosen to be the same as T2, namely 30 μsec. L2 is chosen to be the same as T3, namely 10 μsec. Using this pulse series to drill each hole in the wafer, the potential drilling rate capability of the laser is approximately 2,100 vias per second to provide the desired tapered vias with a reduced extent of debris near the entrance hole and a round exit hole.

The number of sub-series in a series of pulses for which pulse characteristics may be changed is not restricted to only two or three. There can be four, five, ten, twenty sub-series, or the like. In fact, in embodiments of this invention, it is possible to choose different values of pulse characteristics for each pulse in the series to drill a hole in a material. The pulse characteristics which can be changed include pulse energy, pulse width, temporal pulse shape, inter-pulse time interval, and peak power, but are not restricted to only these pulse characteristics.

Figure 13:
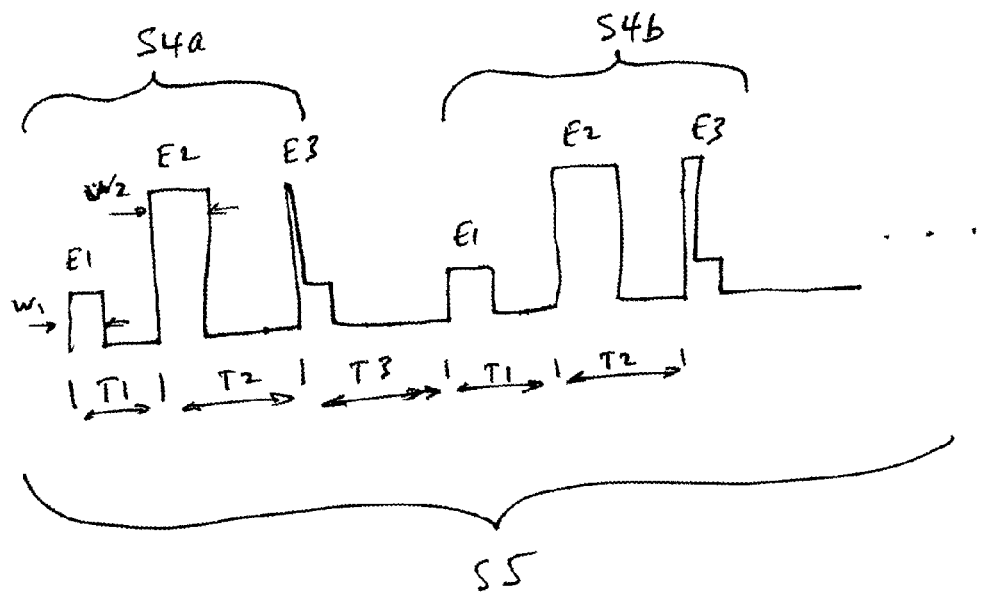
FIG. 13 is a schematic diagram of an embodiment showing a series of pulses suitable for drilling a hole in a material. In this figure, time is on the horizontal axis and power is along the vertical axis.

A series of pulses S5 suitable for drilling a plurality of holes in a material according to an embodiment of the present invention is shown in FIG. 13 where the series of pulses S5 include two sub-series S4a and S4b. Of course, subsequent series of pulses are also included within the scope of the present invention. Pulses in the first sub-series S4a include a first pulse with a pulse energy E1, pulse width W1 and inter-pulse time interval T1. The first sub-series S4a also includes a second pulse with a pulse energy E2, pulse width W2, and inter-pulse time interval T2. The first sub-series S4a further includes a third pulse with a pulse energy E3, inter-pulse time interval T3, and a special pulse shape consisting of a spike and a plateau. Additional pulses can be included in the sub-series and the three illustrated pulses are shown merely for exemplary purposes. In an embodiment, the three or more pulses in the first sub-series are directed to a location of the material for drilling of a single hole. The first pulse with energy E1, pulse width W1, and inter-pulse time interval T1 could be advantageous for drilling the starting portion of the hole, the second pulse with energy E2, pulse width W2, and inter-pulse time interval T2 could be advantageous for drilling the intermediate portion of the hole, and the third pulse with energy E3, inter-pulse time interval T3 and the special pulse shape could be suitable for drilling the final region of the hole to provide the desired hole exit attributes. The time interval T3 between the first sub-series "S4a" and the second sub-series "S4b" could have a value less than either T1 or T2, a value equal to T1 or T2, or a value greater than T1 or T2. In some embodiments, the value T3 is less than five times the larger of T1 or T2, for example, about two times the larger of T1 or T2. The second sub-series S4b can be used to drill a second hole and subsequent sub-series could be used to drill subsequent holes. One of ordinary skill in the art would recognize many variations, modifications, and alternatives.

Embodiments of the invention described herein are not restricted to drilling holes in silicon. Methods according to the present invention may be used to drill holes in other materials. Likewise, methods according to the present invention may be used to drill holes in samples comprised of two or more layers of materials. In fact, in that case, the ability to change pulse characteristics for each layer with no substantial pause is likely to be essential in order to achieve optimal hole attributes in combination with high speed drilling of a hole through each material. If a single laser is used, the process would typically be a one pass process where each hole is fully drilled sequentially, but where each series of pulses contains pulses selected to drill effectively through the material of the first layer, then further pulses selected to drill effectively through the material of the second layer, and so on. According to an embodiment of this invention, the parameters of the pulses to drill through the first layer may change from pulse to pulse to optimize the drilling process of the first layer. Likewise, the parameters of the pulses to drill through the second layer may change from pulse to pulse to optimize the drilling process of the second layer.

If more than one laser is used, for example one laser for each layer, then the process could also be a multiple pass process where one laser drills each hole through one layer for the whole sample in the first pass, then the other laser further drills each hole through a second layer in the second pass, and so on for each subsequent layer. According to an embodiment of this invention, the parameters of the pulses from the first laser to drill through the first layer may change from pulse to pulse to optimize the drilling process of the first layer. Likewise, the parameters of the pulses from the second laser to drill through the second layer may change from pulse to pulse to optimize the drilling process of the second layer, and so on.

Figure 5:
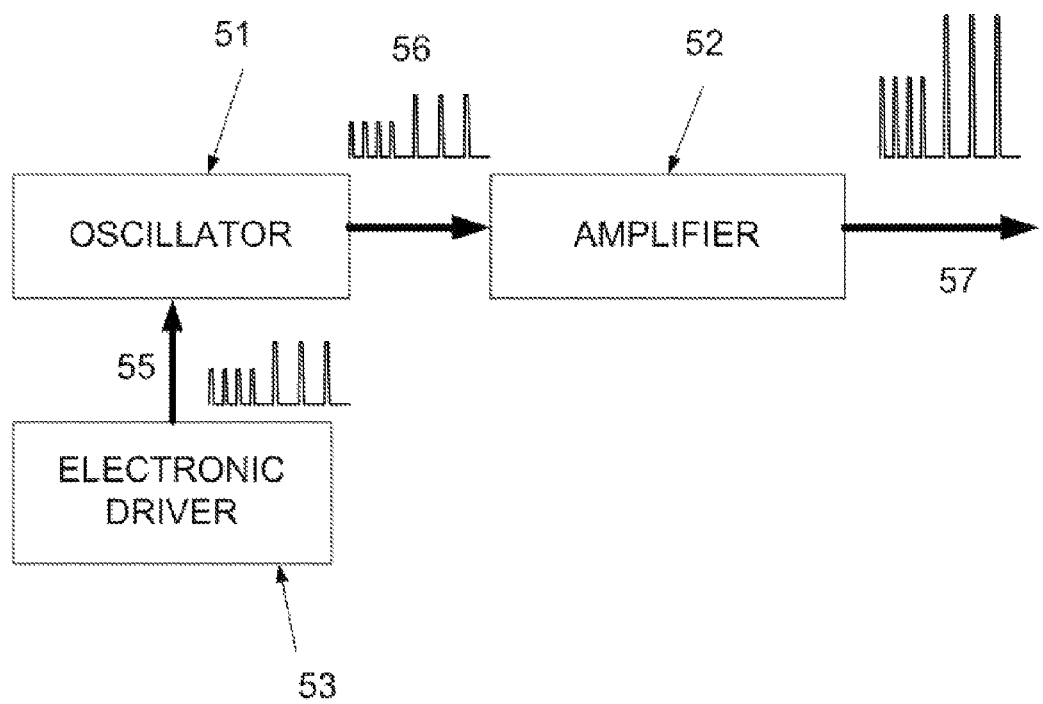
FIG. 5 is a simplified schematic illustration of a pulsed laser with tunable pulse characteristics providing an output series of laser pulses suitable for drilling a hole in a material according to an embodiment of the present invention.

With reference to FIG. 5, a laser system capable of generating series of pulses of the kind disclosed in this application is shown. This laser system includes an oscillator 51, powered by an electronic driver 53, and includes an amplifier 52. Pulsed laser sources such as diode lasers can be pulsed in a simple manner by providing a pulsed electronic drive signal. The attributes of the pulse including pulse energy, pulse width, pulse shape, peak power, and inter-pulse time interval, can be pre-determined by controlling or programming the attributes of the electronic drive signal 55 sent to the oscillator 51 by the electronic driver 53. The signal from such a pulsed laser oscillator is then amplified in a laser amplifier such as a diode-pumped solid state rod laser or a fiber laser amplifier to provide the desired attributes of each pulse in a series 57 of output pulses.

The oscillator laser may consist of a semiconductor laser, a fiber laser, a diode laser, or a distributed feedback diode laser. In a particular embodiment, the pulsed signal source is a semiconductor diode laser operating at a wavelength of 1064 nm with a one watt peak pulse power, a repetition rate variable up to 200 kHz (kilohertz), a pulse width of 5 nanoseconds with a sub-nanosecond pulse risetime and falltime. In alternate embodiments, the peak optical power of the pulsed signal source can be lower or higher than one watt. For example, it can be 500 mW, 1 Watt, 2 Watts, 3 Watts, 4 Watts, 5 Watts or more. Also, the pulse width can be smaller or larger than 100 nanoseconds. For example, it can be 1 ns (nanosecond), 2 ns, 5 ns, 10 ns, 15 ns, 20 ns, and other values. The oscillator laser is driven by an electronic driver such that the shape of the current pulse provided by the electronic driver governs the shape of the oscillator laser output pulse.

The output from the oscillator 51 is amplified in a laser amplifier module 52 consisting for example of a fiber laser amplifier or a diode-pumped solid state rod laser amplifier. In one embodiment of the present invention, the amplifier is an optical amplifier, including a pump that is coupled to a rare-earth-doped fiber loop through an optical coupler. Generally, a semiconductor pump laser is used as a pump, although pumping of optical amplifiers can be achieved by other means as will be evident to one of skill in the art. In a particular embodiment, optical amplifier includes a 5 m length of rare-earth doped fiber, having a core diameter of approximately 4.8 µm and is doped with Ytterbium to a doping density of approximately $6 \times 10^{24}$ ions/m$^3$. The amplifier also includes a pump, which is an FBG-stabilized semiconductor laser diode operating at a wavelength of 976 nm, and having an output power of 500 mW. In another particular embodiment, the optical amplifier 160 includes a 2 m length of rare-earth doped fiber, having a core diameter of approximately 10 µm, and is doped with Ytterbium to a doping density of approximately $1 \times 10^{26}$ ions/m$^3$. The amplifier can also include a pump which is a semiconductor laser diode having an output power of 5 W.

Although the example was given for a Ytterbium-doped fiber amplifier and a laser wavelength of 1064 nm, other examples of diode lasers, solid state lasers, and doped fibers operating at 1064 nm or operating at other wavelengths could be used in other embodiments of the present invention. These include for example erbium-doped fiber in the wavelength region 1550 nm and thulium-doped fiber in the wavelength region 2 to 3 µm.

Figure 6:
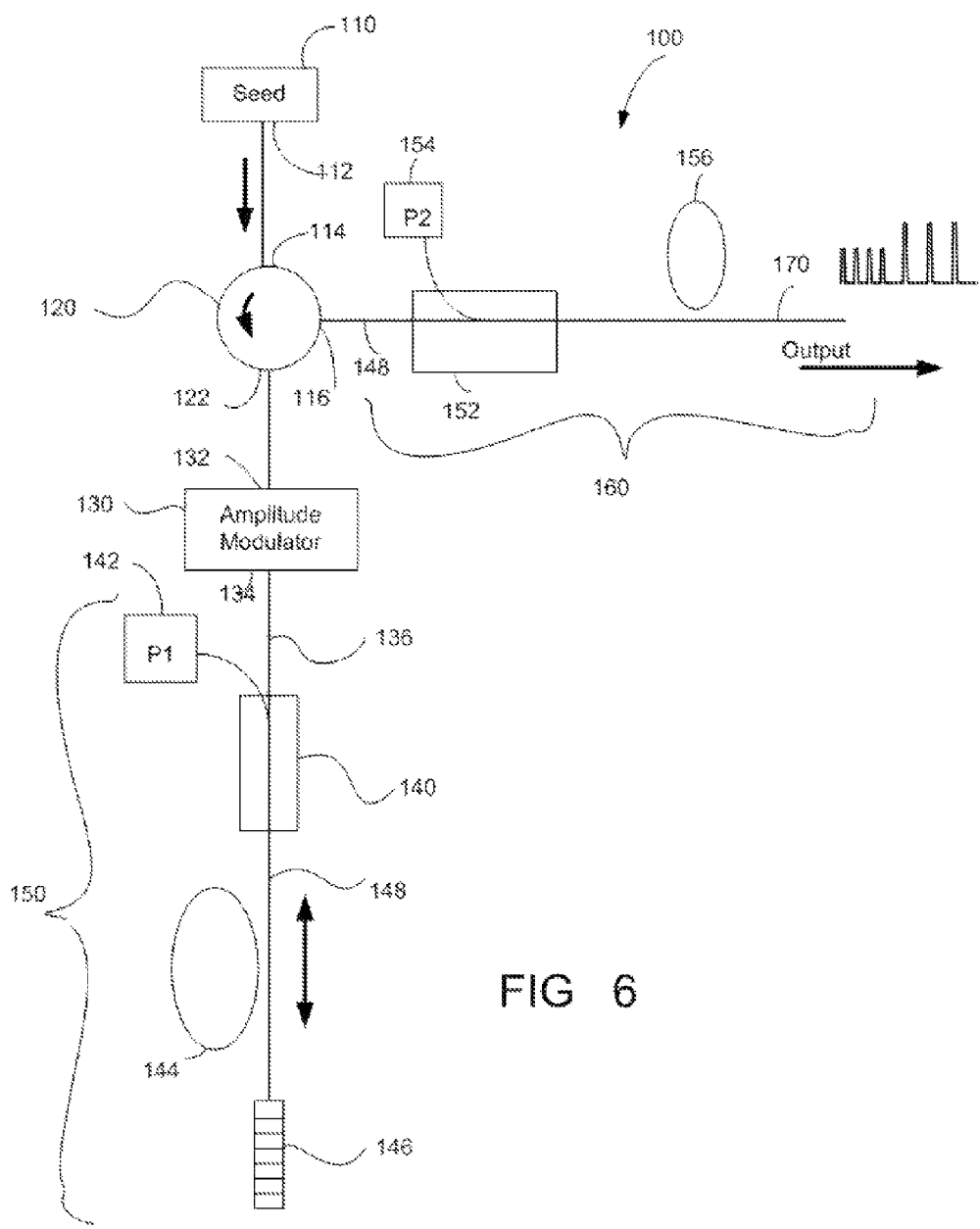
FIG. 6 is a simplified schematic illustration of a pulsed laser with tunable pulse characteristics providing an output series of laser pulses suitable for drilling a hole in a material according to an embodiment of the present invention.

With reference to FIG. 6, in an embodiment of the present invention, a pulsed laser source generating a series of laser pulses to drill a hole in a material is provided. U.S. Pat. No. 7,428,253 titled "Method and System for Pulsed Laser Source with Shaped Optical Waveforms" issued Sep. 27, 2008 describes examples of tunable pulsed laser sources and is hereby incorporated by reference in its entirety. In addition, U.S. patent application Ser. No. 12/210,028 titled "Method and system for a Pulsed Laser Source Emitting Shaped Optical Waveforms" filed Sep. 12, 2008, also describes examples of tunable pulsed laser sources and is hereby incorporated by reference in its entirety. In addition, U.S. Provisional Patent Application No. 61/186,317, filed on Jun. 11, 2009, titled "Stable Tunable High Power Pulsed Laser Source," also describes examples of laser sources suitable for use according to embodiments of the present invention and is hereby incorporated by reference in its entirety. The pulsed laser source includes a seed source 110 adapted to generate a seed signal and an optical circulator 120 having a first port 114 coupled to the seed source, a second port 122, and a third port 116. The pulsed laser source also includes an amplitude modulator 130 characterized by a first side 132 coupled to the second port 122 of the optical circulator and a second side 134. The pulsed laser source further includes a first optical amplifier 150 characterized by an input end 136 and a reflective end 146. The input end is coupled to the second side 134 of the amplitude modulator. Moreover, the pulsed laser source includes a second optical amplifier 160 coupled to the third port 116 of the optical circulator. Although FIG. 6 illustrates the use of one optical amplifier 160 coupled to the third port of the optical circulator, this is not required by some embodiments of the invention. In alternative embodiments, multiple optical amplifiers are utilized downstream of the optical circulator as appropriate to the particular applications.

Figure 7:
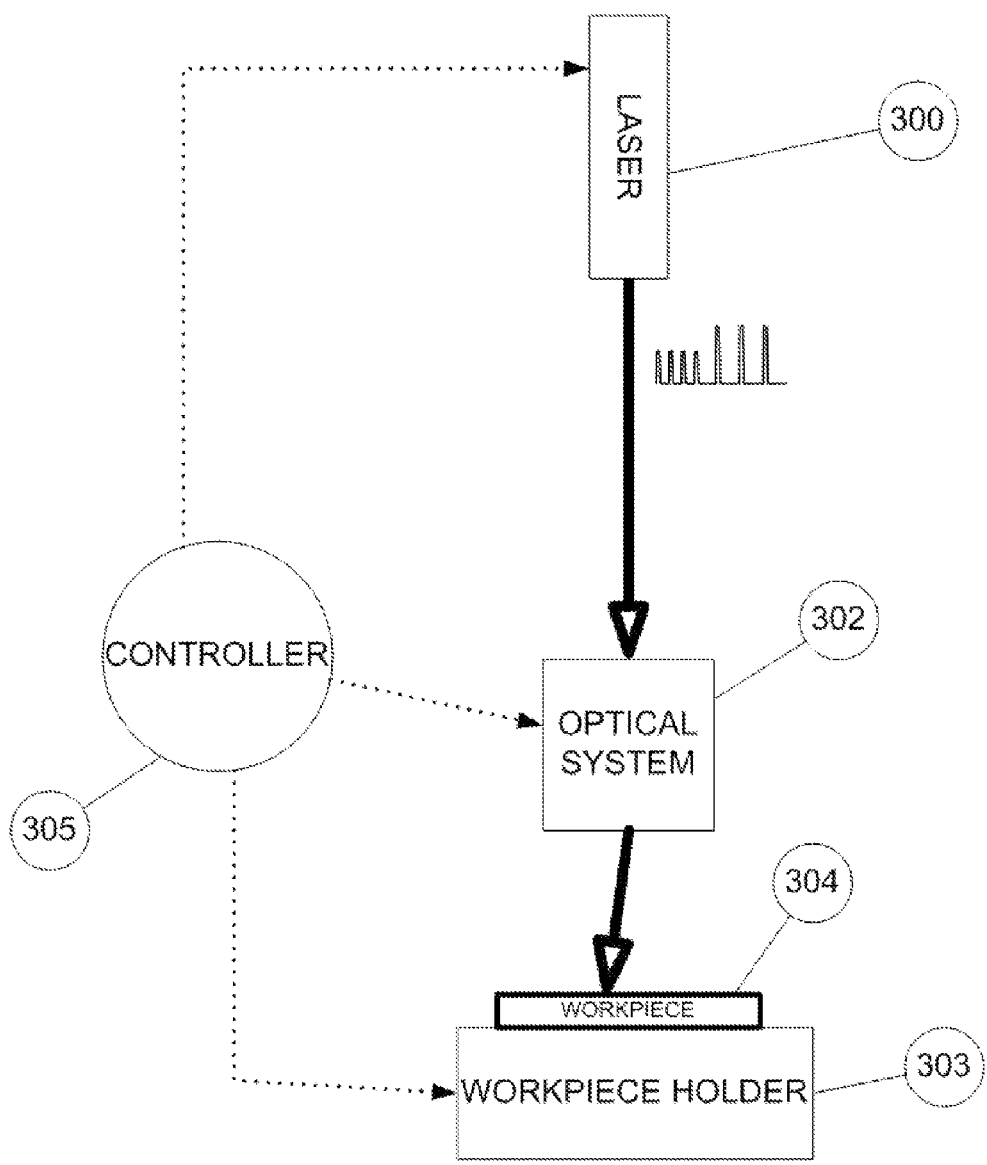
FIG. 7 is a simplified schematic illustration of a laser processing system suitable to drill holes in a material according to an embodiment of the present invention.

According to one embodiment of the present invention, FIG. 7 shows an exemplary laser processing system capable of drilling a hole or holes in a workpiece 304 using a laser generating a series of pulses or multiple series of pulses according to an embodiment of the present invention. The system includes a laser source 300, an optical system 302, a controller 305, and a workpiece 304 that is positioned on top of a workpiece holder 303. The laser source 300 provides laser pulses with certain characteristics, such as wavelength, pulse energy, inter-pulse time period, pulse width, temporal pulse shape, and other characteristics. These and other characteristics of pulses in a series may be adjusted according to embodiments of the present invention to drill a hole or holes in a workpiece. In an embodiment, the laser may include means for generating different wavelengths using techniques such as harmonic generation The optical system may include lenses and mirrors for focusing the laser beam to a laser spot on the workpiece, and a component for directing the laser spot to various positions on the workpiece to drill more than one hole. In a specific embodiment, the component for directing the beam may be mirrors mounted on galvanometers. The controller may be used to control the optical system and the motion of the component for directing beam. For example, when drilling holes in workpiece 304, the optical system 302 may be controlled by the controller to redirect the laser spot from position to position along the surface of the workpiece. In another embodiment, the optical system may focus the laser beam to a laser spot at or near the surface of the workpiece and the workpiece holder may be controlled by the controller to move the workpiece to drill subsequent holes. In yet another embodiment, the lenses and mirrors which focus the laser beam may produce a spot with certain desirable spatial parameters, such as for example a flat-topped spatial profile.

In order to drill a number N of holes, the laser system provides N predetermined series $S_1, S_2, \ldots S_N$ of laser pulses with a time interval between each series of sufficient length to allow the laser spot to be repositioned from one region of the sample where the hole has been drilled to another region of the sample where the next hole is to be drilled. In a particular embodiment each series of pulses will be identical to each other series with the goal that each hole drilled thereby is approximately identical to each of the other holes. In a particular embodiment designed to drill identical holes in a uniform material such as a silicon wafer, a laser system is provided to generate a series of laser pulses such that certain of the pulses within each series will have laser parameters which differ significantly and intentionally from other laser pulses in the series with the goal that each hole drilled thereby is approximately identical to each of the other holes and has certain preferred characteristics, and the laser system is included in a processing system including means to direct the laser beam at each hole to be drilled and to control the drilling process. In a further particular embodiment designed to drill N different holes in a uniform material such as a silicon wafer, a laser system is provided to generate N predetermined series $S_1, S_2, \ldots S_N$ of laser pulses such that certain of the pulses within one or more series will have laser parameters which differ significantly and intentionally from other laser pulses in the same series, and certain series will include pulses whose laser parameters differ from those contained within other series, with the goal that certain of the N holes drilled thereby will have certain preferred characteristics different from those of other holes in the wafer, and the laser system is included in a processing system including means to direct the laser beam at each hole to be drilled and to control the drilling process. In another embodiment, the characteristics chosen for pulses in one series may be different from the characteristics chosen for another series.

Figure 8:
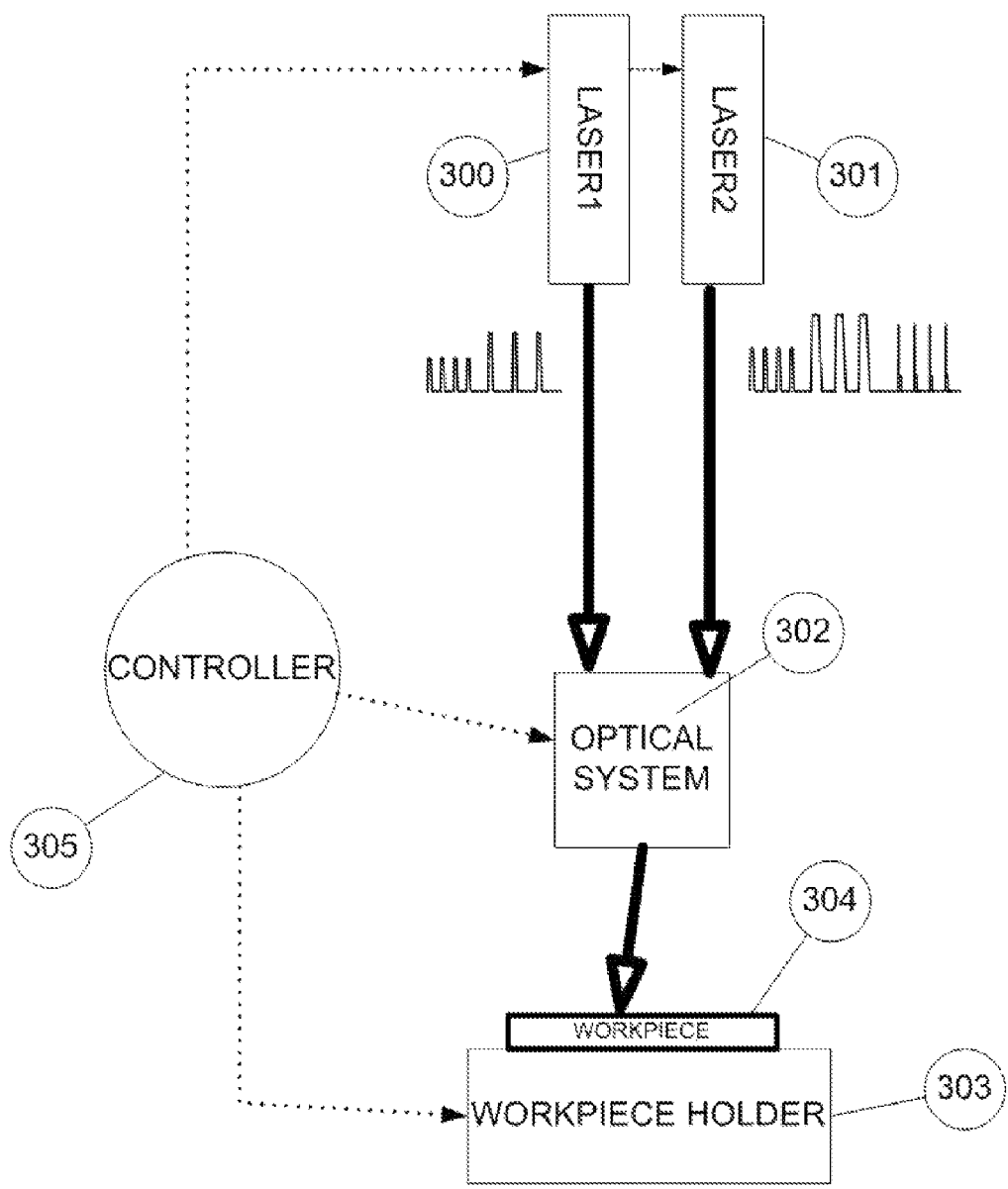
FIG. 8 is a simplified schematic illustration of a laser processing system suitable to drill holes in a material according to an embodiment of the present invention.

According to another embodiment of the present invention, FIG. 8 shows an exemplary laser processing system capable of drilling a hole or holes in a workpiece 304 using a first laser source 300 and a second laser source 301 generating a series of pulses or multiple series of pulses according to an embodiment of the present invention. The system includes a first laser source 300, an optical system 302, a controller 305, and a workpiece 304 that is positioned on top of a workpiece holder 303. The first laser source 300 provides laser pulses with certain characteristics, such as wavelength, pulse energy, inter-pulse time period, pulse width, temporal pulse shape, and other characteristics. These and other characteristics of pulses in a series of may be adjusted according to embodiments of the present invention. The system further includes a second laser source 301. The second laser source 301 provides laser pulses with certain characteristics, such as wavelength, pulse energy, inter-pulse time period, pulse width, temporal pulse shape, and other characteristics. These and other characteristics of pulses in a series may be adjusted according to embodiments of the present invention. The pulse characteristics associated with the first laser source 300 and the second laser source 301 can be different. For example, the first laser source could be operating at a first wavelength and the second laser source could be operating at a second wavelength different from the first wavelength. Other differences in pulse characteristics can include laser power, pulse energy, inter-pulse time period, pulse width, temporal pulse shape, and the like.

The optical system may include lenses and mirrors for focusing the laser beams to laser spots on the workpiece, and components for directing the laser spots to various positions on the workpiece where holes are to be drilled. In a specific embodiment, the component for directing the beam may be mirrors mounted on galvanometers. The controller may be used to control the optical system and the motion of the component for directing the beam. For example, when drilling holes in workpiece 304, the optical system 302 may be controlled by the controller to move the beams from position to position along the surface of the workpiece. In another embodiment, the optical system may focus the laser beams to laser spots at or near the surface of the workpiece, and the workpiece holder may be controlled by the controller to move the workpiece to drill subsequent holes.

The processing system may drill a series of holes in the workpiece using a single pass or using a number of passes. In an embodiment of the present invention to drill N holes in a two-layered sample using two lasers using a double pass process, the first laser system may provide a number N of predetermined series $S_1, S_2, \ldots S_N$ of laser pulses with a time interval between each series of sufficient length to allow the laser beam to be redirected from one hole to the next in order to pre-drill each hole. The second laser may then provide N predetermined series $R_1, R_2, \ldots R_N$ of laser pulses to complete the drilling of each hole. This is therefore a two pass drilling process which may be used for example to drill through holes in a sample consisting of two layers of different material such as a printed circuit board consisting of one layer of dielectric and one layer of copper.

Figure 9:
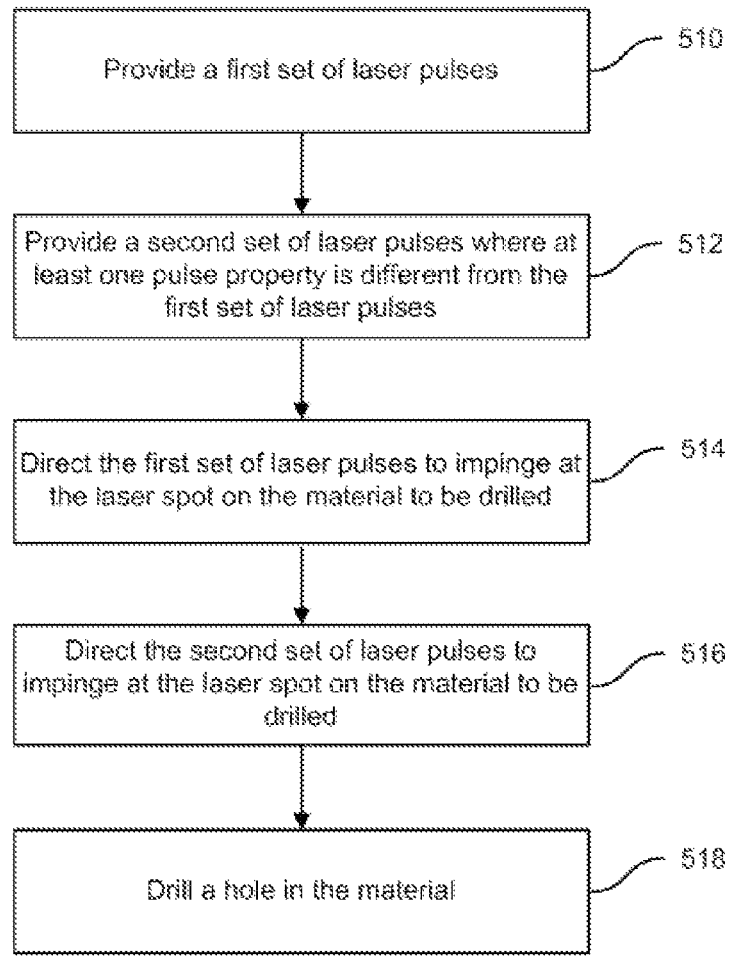
FIG. 9 is a flow chart illustrating a method for drilling a hole in a material using a series of pulses according to an embodiment of the present invention.

FIG. 9 is a flow chart illustrating a method for drilling a hole in a material using a series of pulses according to an embodiment of the present invention. The series of pulses includes a first sub-series of a first set of pulses characterized by a first pulse energy, a first pulse width, a first pulse shape, a first wavelength, and a first inter-pulse time interval. The first sub-series is followed by a second sub-series of a second set of pulses characterized by a second pulse energy, a second pulse width, a second pulse shape, a second wavelength, and a second inter-pulse time interval. According to an embodiment of this invention, at least one of a second pulse energy is different from a first pulse energy, or a second pulse width is different from a first pulse width, or a second pulse shape is different from a first pulse shape, or a second wavelength is different from a first wavelength with the result that an improved hole is drilled compared to that hole drilled when each pulse in the series has identical properties.

Figure 10:
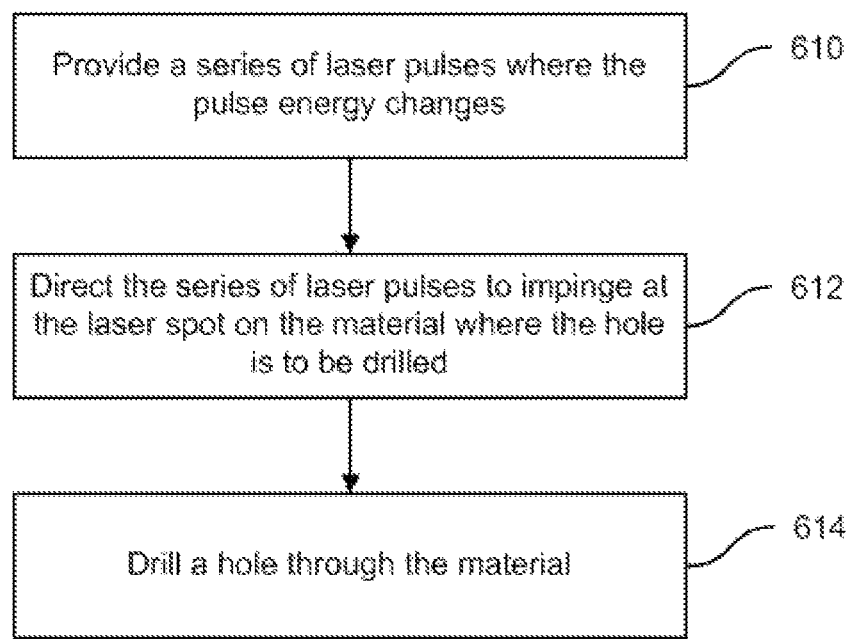
FIG. 10 is a flow chart illustrating a method for drilling a hole in a material using a series of pulses according to an embodiment of the present invention.

FIG. 10 is a flow chart illustrating a method for drilling a hole in a material using a series of pulses according to an embodiment of the present invention. In the series of pulses, no pulse is separated in time from the immediately preceding or the immediately following pulse by more than 0.01 seconds. According to an embodiment of the present invention, the pulse energy of at least one pulse in the series is less than the pulse energy of another pulse in the series with the result that an improved hole is drilled compared to that hole drilled when each pulse in the series has the same pulse energy as every other pulse in the series.

Figure 11:
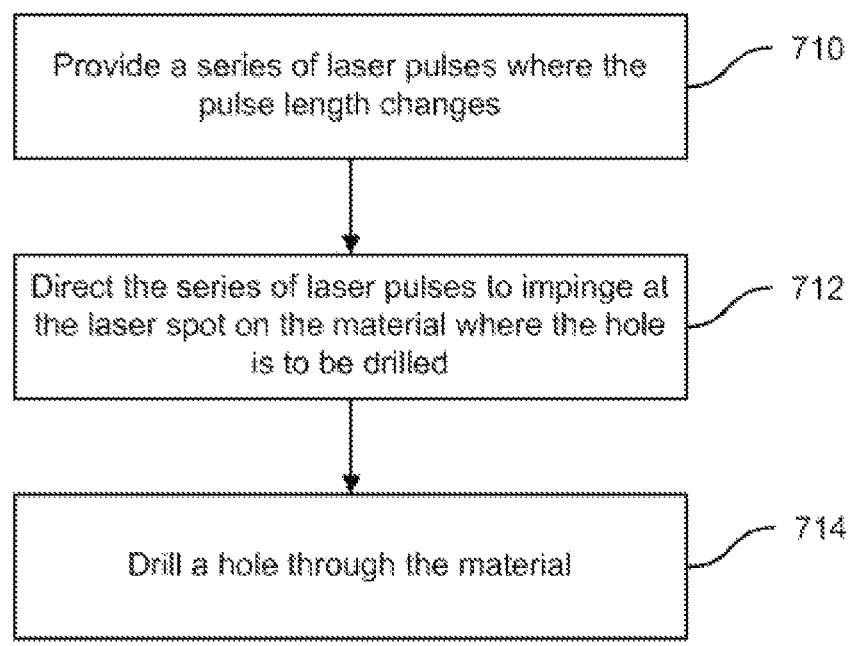
FIG. 11 is a flow chart illustrating a method for drilling a hole in a material using a series of pulses according to an embodiment of the present invention.

FIG. 11 is a flow chart illustrating a method for drilling a hole in a material using a series of pulses according to an embodiment of the present invention. In the series of pulses, no pulse is separated in time from the immediately preceding or the immediately following pulse by more than 0.01 seconds. According to an embodiment of this invention, the pulse width of at least one pulse in the series is less than the pulse width of another pulse in the series with the result that an improved hole is drilled compared to that hole drilled when each pulse in the series has the same pulse width as every other pulse in the series.

Figure 12:
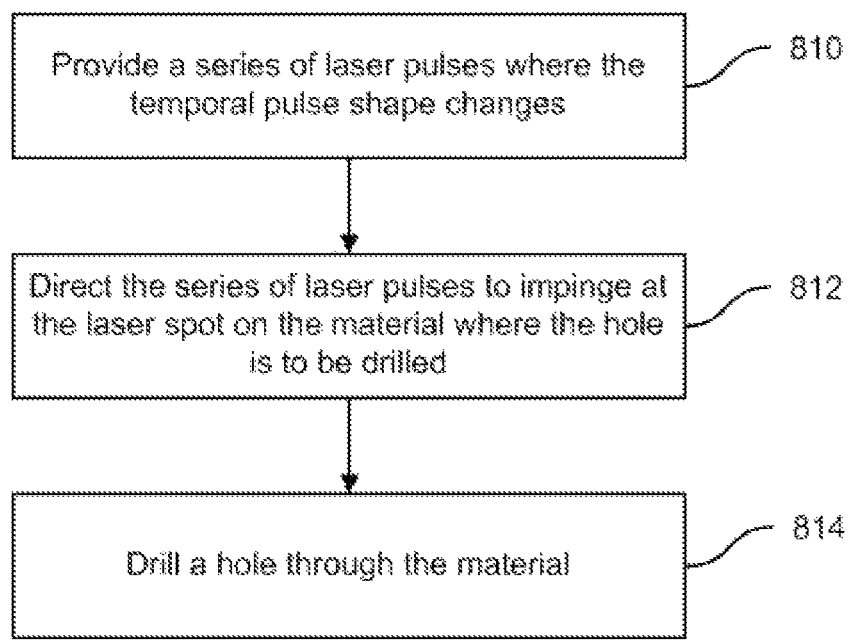
FIG. 12 is a flow chart illustrating a method for drilling a hole in a material using a series of pulses according to an embodiment of the present invention.

FIG. 12 is a flow chart illustrating a method of drilling a hole in a material using a series of pulses according to an embodiment of the present invention. In the series of pulses, no pulse is separated in time from the immediately preceding or the immediately following pulse by more than 0.01 seconds. According to an embodiment of this invention, the temporal pulse shape of at least one pulse in the series is substantially different from the temporal pulse shape of another pulse in the series with the result that an improved hole is drilled compared to that hole drilled when each pulse in the series has the same temporal pulse shape as every other pulse in the series.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A method of drilling a hole in a material using multiple laser pulses, the method comprising:
   providing a first set of laser pulses, each of the laser pulses being characterized by a first pulse energy, a first pulse width, a first pulse shape, a first wavelength, and a first inter-pulse time interval;
   providing a second set of laser pulses, each of the laser pulses characterized by a second pulse energy, a second pulse width, a second pulse shape, a second wavelength, and a second inter-pulse time interval, wherein at least one of the second pulse energy is different from the first pulse energy, the second pulse width is different from the first pulse width, the second pulse shape is different from the first pulse shape, or the second wavelength is different from the first wavelength;
   directing the first set of laser pulses to impinge at a laser spot to begin drilling a hole in the material;
   drilling at the laser spot using a plurality of laser pulses having pulse energies different from the first set of pulses and from the second set of pulses until a partially completed hole through the material is formed; and
   directing the second set of laser pulses to impinge within the partially completed hole at the laser spot to form an exit hole feature in the material, wherein the second pulse energy is less than the pulse energies of the plurality of laser pulses.

2. The method of claim 1 wherein the multiple laser pulses are provided by a single laser.

3. The method of claim 1 wherein a time between a last pulse of the first set of laser pulses and a first pulse of the plurality of laser pulses is less than five times the larger of the first inter-pulse time period or the second inter-pulse time period.

4. The method of claim 1 wherein the material comprises at least one of a semiconductor or silicon.

5. The method of claim 1 wherein at least one of the first wavelength or the second wavelength is less than 1064 nm.

6. The method of claim 1 wherein the first pulse width is equal to the second pulse width and the first pulse shape is the same as the second pulse shape.

7. The method of claim 1 wherein the first pulse energy is the same as the second pulse energy, and the first pulse shape is the same as the second pulse shape.

8. The method of claim 1 wherein the first pulse energy and the second pulse energy are each greater than 0.05 mJ and less than 2 mJ.

9. The method of claim 1 wherein the first pulse width and the second pulse width are each greater than 20 ns and less than 5000 ns.

10. The method of claim 1 wherein a time between a last pulse of the first set of laser pulses and a first pulse of the plurality of laser pulses is substantially the same as the first inter-pulse time interval.

11. The method of claim 1 wherein a time between a last pulse of the first set of laser pulses and a first pulse of the plurality of laser pulses is substantially the same as the second inter-pulse time interval.

12. The method of claim 1 wherein the first wavelength is equal to the second wavelength.

13. The method of claim 12 wherein the first wavelength and the second wavelength are 1064 nm.

14. The method of claim 1 further comprising:
   determining the first pulse energy, the first pulse width, and the first pulse shape prior to providing the first set of laser pulses; and
   determining the second pulse energy, the second pulse width, and the second pulse shape prior to providing the second set of laser pulses, wherein at least the second pulse energy is not equal to the first pulse energy, the second pulse width is not equal to the first pulse width, or the second pulse shape is not the same as to the first pulse shape.

15. The method of claim 14 further comprising:
   determining the first wavelength and the first inter-pulse time interval prior to providing the first set of laser pulses; and
   determining the second wavelength and the second inter-pulse time interval prior to providing the second set of laser pulses.

16. A method of drilling a hole in a material using a series of optical pulses, each of the optical pulses being characterized by a wavelength, the method comprising:
   providing one or more first optical pulses as a first set of pulses, each of the first optical pulses being characterized by a first pulse energy, a first pulse width, and a first pulse shape;
   providing one or more second optical pulses as a second set of pulses, each of the second optical pulses being characterized by a second pulse energy, a second pulse width, and a second pulse shape;
   providing one or more third optical pulses as a third set of pulses, each of the third optical pulses being characterized by a third pulse energy, a third pulse width, and a third pulse shape;
   directing the first set of pulses to impinge on the material at a location;
   directing the second set of pulses to impinge on the material at the location, and wherein the second set of pulses is adapted for a relatively fast drilling speed;
   directing the third set of pulses to impinge on the material at the location, and wherein the third set of pulses is adapted for formation of an exit hole feature; and
   drilling the hole in the material at the location.

17. The method of claim 16 wherein the material comprises at least a semiconductor or silicon.

18. The method of claim 16 wherein:
the first pulse energy is between 0.05 mJ and 2 mJ;
the second pulse energy is between 0.05 mJ and 2 mJ; and
the third pulse energy is less than the second pulse energy, and between 0.05 mJ and 2 mJ.

19. The method of claim 16 wherein:
the first pulse width is between 20 ns and 5 µs;
the second pulse width is longer than the first pulse width and the third pulse width, and between 20 ns and 5 µs; and
the third pulse width is between 20 ns and 5 µs.

20. The method of claim 16 further comprising:
determining the first pulse energy, the first pulse width, and the first pulse shape prior to providing the first set of pulses;
determining the a second pulse energy, the second pulse width, and the second pulse shape prior to providing the second set of pulses; and
determining the third pulse energy, the third pulse width, and the third pulse shape prior to providing the third set of pulses, wherein at least the second pulse energy is not equal to the first pulse energy, the second pulse width is not equal to the first pulse width, or the second pulse shape is not the same as the first pulse shape.

21. The method of claim 20 wherein the second pulse energy is not equal to the third pulse energy, the second pulse width is not equal to the third pulse width, or the second pulse shape is not the same as the third pulse shape.

22. A method of drilling a plurality of holes in a material using a series of laser pulses, the method comprising:
providing the series of laser pulses including a first set of laser pulses in a first pass over a plurality of drilling locations for the plurality of holes being characterized by a first wavelength, a first pulse energy, a first pulse width, and a first pulse shape and a second set of laser pulses in a second pass over a plurality of drilling locations for the plurality of holes being characterized by a second wavelength, a second pulse energy, a second pulse width, and a second pulse shape, wherein the first series of laser pulses differs from the second series of laser pulses in at least one of wavelength, pulse energy, pulse width, or pulse shape;
in the first pass, directing a first pulse of the first set of laser pulses to impinge on the material at a first drilling location;
directing subsequent pulses of the first set of laser pulses to impinge on the material at subsequent drilling locations;
after the first pass and in the second pass, directing a first pulse of the second set of laser pulses to impinge on the material at the first location; and
directing subsequent pulses of the second set of laser pulses to impinge on the material at the subsequent drilling locations.

23. The method of claim 22 wherein the second series of laser pulses differ from the first series of laser pulses in pulse width.

24. The method of claim 22 wherein laser pulses in the second series of laser pulses have a longer pulse width and lower pulse height than laser pulses in the first series of laser pulses.

25. The method of claim 22 wherein the second series of laser pulses differ from the first series of laser pulses in pulse energy.

26. The method of claim 22 further comprising
providing a third set of laser pulses being characterized by a third wavelength, a third pulse energy, a third pulse width, and a third pulse shape, wherein the third series of laser pulses differs from at least the first series of laser pulses or the second series of laser pulses in at least one of wavelength, pulse energy, pulse width, or pulse shape;
directing a first pulse of the third set of laser pulses to impinge on the material at the first drilling location; and
directing subsequent pulses of the third set of laser pulses to impinge on the material at the subsequent drilling locations.

27. The method of claim 26 wherein the third series of laser pulses is adapted for formation of an exit hole feature, and differ from at least the second series of laser pulses in pulse width.

28. The method of claim 26 wherein laser pulses in the third series of laser pulses have a pulse shape including a peak and a plateau.

29. The method of claim 26 wherein the third series of laser pulses have a pulse energy less than the second series of laser pulses.

30. A method of drilling a hole in a material using a series of laser pulses, the method comprising:
providing a series of laser pulses comprising a first laser pulse adapted for providing an entrance hole feature in the material characterized by a first wavelength, a first pulse energy, a first pulse width, and a first pulse shape, a second laser pulse adapted for providing an increased drilling rate relative to the first laser pulse characterized by a second wavelength, a second pulse energy, a second pulse width, and a second pulse shape, and a third laser pulse characterized by a third wavelength, a third pulse energy, a third pulse width, and a third pulse shape, wherein the first laser pulse differs from the second laser pulse in at least one of wavelength, pulse energy, pulse width, or pulse shape and the third laser pulse adapted for providing an exit hole feature in the material differs from at least one of the first laser pulse or the second laser pulse in at least one of wavelength, pulse energy, pulse width, or pulse shape;
directing the first laser pulse to impinge on the material at a drilling location;
directing the second laser pulse to impinge on the material at the drilling location; and
directing the third laser pulse to impinge on the material at the drilling location.

31. The method of claim 30 further comprising:
providing subsequent sets of the series of laser pulses; and
directing the subsequent sets of the series of laser pulses at subsequent drilling locations.

32. The method of claim 30 wherein the third laser pulse differs from at least the first laser pulse or the second laser pulse in pulse width.

33. The method of claim 30 wherein the third laser pulse differs from at least the first laser pulse or the second laser pulse in pulse shape.

34. The method of claim 30 wherein the third laser pulse has a pulse energy less than the second laser pulse.

35. The method of claim 30 wherein the second laser pulse differs from the first laser pulse in pulse width.

36. The method of claim 30 wherein the second laser pulse differs from the first laser pulse in pulse shape.

37. The method of claim 30 wherein the second laser pulse differs from the first laser pulse in pulse energy.

* * * * *

UNITED STATES PATENT AND TRADEMARK OFFICE
CERTIFICATE OF CORRECTION

PATENT NO. : 8,816,246 B2
APPLICATION NO. : 13/100995
DATED : August 26, 2014
INVENTOR(S) : Richard Murison and Mathew Rekow It is certified that error appears in the above-identified patent and that said Letters Patent is hereby corrected as shown below:

In the Claims

In claim 22, column 23, line 42, delete "series of laser pulses differs from the second series" and insert -- set of laser pulses differs from the second set --.

In claim 22, column 23, line 52, before "location" insert -- drilling --.

In claim 23, column 23, lines 56-57, delete "second series of laser pulses differ from the first series" and insert -- second set of laser pulses differs from the first set --.

In claim 24, column 23, line 60, delete "second series" and insert -- second set --.

In claim 24, column 23, line 61, delete "first series" and insert -- first set --.

In claim 25, column 23, line 63, delete "second series" and insert -- second set --.

In claim 25, column 23, line 64, delete "first series" and insert -- first set --.

In claim 26, column 24, line 4, delete "third series" and insert -- third set --.

In claim 26, column 24, line 5, delete "first series" and insert -- first set --.

In claim 26, column 24, line 6, delete "second series" and insert -- second set --.

In claim 27, column 24, line 13, delete "third series" and insert -- third set --.

In claim 27, column 24, line 15, delete "differ from at least the second series" and insert -- differs from at least the second set --.

Signed and Sealed this
First Day of March, 2016

Michelle K. Lee
*Director of the United States Patent and Trademark Office*

CERTIFICATE OF CORRECTION (continued)
U.S. Pat. No. 8,816,246 B2

In claim 28, column 24, lines 17-18, delete "third series" and insert -- third set --.

In claim 29, column 24, line 20, delete "third series" and insert -- third set --.

In claim 29, column 24, line 21, delete "second series" and insert -- second set --.